United States Patent [19]
Kouyama et al.

[11] Patent Number: 5,481,662
[45] Date of Patent: Jan. 2, 1996

[54] METHOD OF AND APPARATUS FOR MODIFYING BASE SEPARATION FIGURE

[75] Inventors: Satoshi Kouyama; Yasushi Ohshima, both of Kyoto, Japan

[73] Assignee: Dainippon Screen Mfg. Co., Ltd., Kyoto, Japan

[21] Appl. No.: 312,736

[22] Filed: Sep. 27, 1994

[30] Foreign Application Priority Data

Oct. 8, 1993 [JP] Japan .................... 5-277797

[51] Int. Cl.$^6$ .................... G06T 3/00
[52] U.S. Cl. .................... 395/135; 395/133; 395/134; 395/139; 395/121
[58] Field of Search .................... 395/100, 117, 395/118, 119, 121, 122, 125, 133–139; 382/47; 345/113, 114

[56] References Cited

U.S. PATENT DOCUMENTS

| | | | |
|---|---|---|---|
| 4,949,279 | 8/1990 | Takakura et al. | 395/118 |
| 5,261,030 | 11/1993 | Brooke | 395/135 |
| 5,271,097 | 12/1993 | Barker et al. | 395/135 |
| 5,283,867 | 2/1994 | Bayley et al. | 395/135 X |
| 5,293,471 | 3/1994 | Ikeuchi et al. | 395/135 X |

FOREIGN PATENT DOCUMENTS

| | | |
|---|---|---|
| 539953 | 5/1993 | European Pat. Off. . |
| 2506817A1 | 8/1976 | Germany . |
| WO-A-9215967 | 9/1992 | WIPO . |

*Primary Examiner*—Almis R. Jankus
*Attorney, Agent, or Firm*—Lowe, Price, LeBlanc & Becker

[57] ABSTRACT

An original figure corresponding to a contracted white separation figure is extracted as an objective figure (step T2), and original figures adjacent to the objective figure are then extracted (step T3). When a white separation figure corresponding to a contiguous figure is a contracted type or a expanded type, a white separation figure corresponding to the objective figure is modified by computing a logical sum of the objective figure and the contiguous figure (step T5), executing the choking process (step T6), and executing the subsequent logical operations (steps T7 and T8). When a white separation figure corresponding to a contiguous figure is a clipped type or has a shape identical with that of the contiguous figure, the white separation figure corresponding to the objective figure is modified by generating an extended figure (step T9 or T11) and adding the slip-in figure to the white separation figure corresponding to the objective figure.

12 Claims, 22 Drawing Sheets

FIRST INTERMEDIATE FIGURE G1(OF1,OF2)

G1=OF1 OR OF2

SECOND INTERMEDIATE FIGURE G2 (OF1,OF2)

Ws=Wt1=Wt2

THIRD INTERMEDIATE FIGURE G3 (OF1,OF2)

G3=G2 AND OF1

MODIFIED WHITE SEPARATION WF1a FIGURE

THIRD INTERMIDIATE FIGURE G3(OF1,OF3)

MODIFIED WHITE SEPARATION FIGURE WF1b

WF1b = G3 OR WF1a

= CP2 OR WF1a

SLIP-IN FIGURE G4(OF1,OF4)

MODIFIED WHITE SEPARATION FIGURE WF1c

SLIP-IN FIGURE G5(OF1,OF5)

MODIFIED WHITE SEPARATION FIGURE WF1d

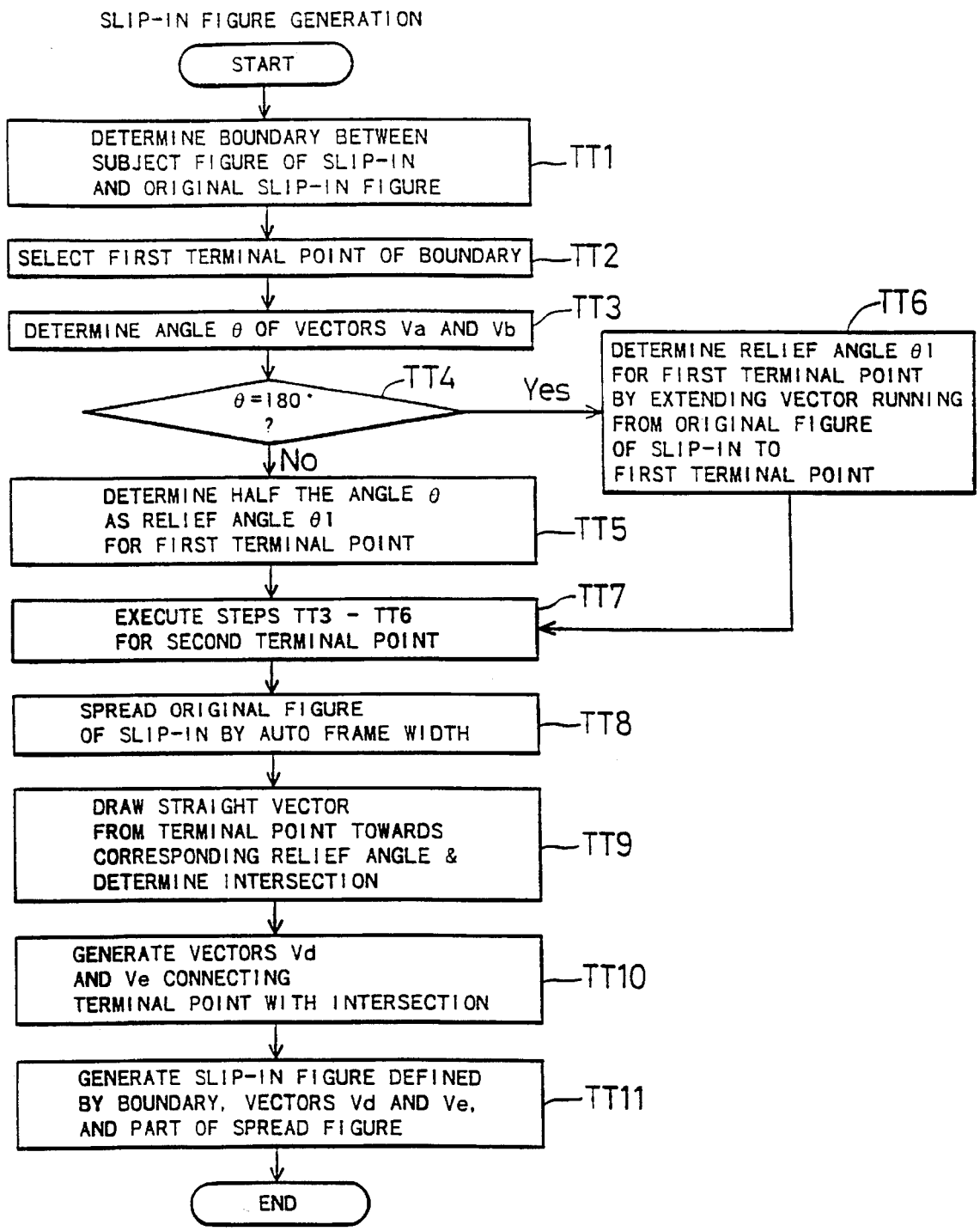

RELIEF ANGLE $\theta 1 = \frac{1}{2}\theta = 45°$

RELIEF ANGLE $\theta 2 = \frac{1}{2}\theta = 45°$

MODIFIED WHITE SEPARATION FIGURE

CONTRACTED WHITE SEPARATION FIGURE

ORIGINAL FIGURE → CONTRACTED WHITE SEPARATION FIGURE

EXPANDED WHITE SEPARATION FIGURE

ORIGINAL FIGURE → EXPANDED WHITE SEPARATION FIGURE

CLIPPED WHITE SEPARATION FIGURE

ORIGINAL FIGURES → CLIPPED WHITE SEPARATION FIGURE / CUT-OUT ORIGINAL FIGURE

METHOD OF AND APPARATUS FOR MODIFYING BASE SEPARATION FIGURE

BACKGROUND OF THE INVENTION

1. Field of the Invention

The present invention relates to a method of and an apparatus for processing graphic data to modify a base separation figure such as a white separation figure, which is often used as a background image area in a prepress process.

2. Description of the Related Art

Soft wrapping materials such as vinyl or cellophane sheets are used for packages, on which color figures and characters are printed. In ordinary printing process using a white printing paper, the density of each halftone image for each color ink is adjusted to reproduce desired colors on a white paper sheet. In the case of the printing on a soft wrapping material, especially on a transparent material, a desired color is not reproduced according to the same method as the printing on a white paper sheet. In order to reproduce a desired color on a soft wrapping material, specific areas corresponding to the color figures and characters to be printed are first painted with white ink, and color inks are then applied on the white-painted areas. These areas to be painted with white ink are referred to as white separation figures.

There are three different types of white separation figures as shown in FIGS. 20(A) through 20(C): a contracted white separation figure shown in FIG. 20(A), an expanded white separation figure shown in FIG. 20(B), and a clipped white separation figure shown in FIG. 20(C). Graphics and characters which are to be printed on the white separation figures are hereinafter referred to as original figures in the specification.

A contracted white separation figure is generated by thinning an original figure by a predetermined width. An outline of the contracted white separation figure, which is actually hidden under the original figure is illustrated by broken lines in FIG. 20(A). The contracted white separation figure effectively prevents white lines from being observed around the original figure when a soft wrapping material expands or shrinks to cause misalignment of printing plates.

An expanded white separation figure is generated by spreading an original figure by a predetermined width (see FIG. 20(B)). Expanded white separation figures are generally created according to various design requirements in printing.

A clipped white separation figure is created when two original figures are in contact with each other (see FIG. 20(C)). The clipped white separation figure is generated by spreading one of the two original figures (a figure representing a letter 'H' in the example of FIG. 20(C)) by a predetermined width and cutting the other original figure along a new outline of the clipped white separation figure. This results in a clipped white separation figure formed between the two original figures. In some cases, white images are reproduced by leaving part of the white separation figures without color ink thereon.

FIG. 21 is a plan view illustrating two original figures OFa and OFb and two white separation figures WFa and WFb generated from the original figures OFa and OFb. Both of the white separation figures WFa and WFb are generated according to the above thinning process. When a plurality of original figures are in intimate contact with each other as in the example of FIG. 21, an observable gap is undesirably made between the white separation figures WFa and WFb, and the original figures do not reproduce desirable colors in the gap consequently.

A conventional method manually corrects such white separation figures to bring these white separation figures in direct contact with each other. When original figures and white separation figures have complicated shapes, correction of the white separation figures to appropriate shapes requires the skill and the relatively long time.

Incidentally, basic separation figures other than white separation figures are sometimes used, such as silver separation figures or gold separation figures. The above problem also exists with these basic separation figures.

SUMMARY OF THE INVENTION

An object of the present invention is thus to provide a novel method of modifying a base separation figure to have an appropriate shape with respect to an adjacent original figure.

The above object is attained at least partly by a method of modifying a base separation figure to be painted with a specific base color ink, the method comprising the steps of: (a) providing original figure data representing a plurality of original figures and base separation figure data representing a plurality of base separation figures corresponding to the plurality of original figures, each base separation figure representing an area laid under the corresponding original figure; (b) selecting an original figure to which a corresponding base separation figure is produced by contracting the original figure, and determining the selected original figure as an objective figure; (c) extracting one of the plurality of original figures which is adjacent to the objective figure, and determining the extracted original figure as a target contiguous figure to be processed; (d) when an outline of the target contiguous figure is in contact with an outline of the objective figure, producing a first intermediate figure by obtaining a logical sum of the objective figure and the target contiguous figure, producing a second intermediate figure by contracting the first intermediate figure by a predetermined width, producing a third intermediate figure by obtaining a logical product of the second intermediate figure and the objective figure, and producing a fourth intermediate figure by obtaining a logical sum of the third intermediate figure and a base separation figure corresponding to the objective figure; and (e) repeating the steps (c) and (d) to produce a plurality of fourth intermediate figures respectively corresponding to original figures adjacent to the objective figure, and obtaining a logical sum of the plurality of fourth intermediate figures to produce a modified base separation figure corresponding to the objective figure.

The method can easily modify the shape of a base separation figure to fill up a gap between contracted base separation figures or a gap between a contracted base separation figures and an expanded base separation figure.

According to a preferred embodiment, the step (d) comprises the step of: (f) when an outline of a base separation figure corresponding to the target contiguous figure is in contact with the outline of the objective figure, producing a linkage figure for linking the base separation figures corresponding to the target contiguous figure and the objective figure, and obtaining a logical sum of the linkage figure and the base separation figure corresponding to the objective figure to produce a fifth intermediate figure with respect to the objective figure; and wherein the step (e) comprises the step of: repeating the steps (c), (d), and (f) and obtaining a logical sum of the fourth intermediate figure and the fifth intermediate figure for the original figures adjacent to the objective figure, to thereby produce the modified base separation figure corresponding to the objective figure.

Accordingly, a contracted base separation figure is effectively connected with a clipped base separation figure.

Preferably, the step (f) comprises the steps of: finding a boundary between the objective figure and the base separation figure corresponding to the target contiguous figure; when a starting point of the boundary is a terminal point of a line segment constituting one side of the objective figure, producing a first line which internally divides an interior angle of the objective figure at the starting point, and when the starting point is not a terminal point of a line segment constituting one side of the objective figure, producing a second line by extending a specific side of the base separation figure corresponding to the target contiguous figure, the specific side starting from the starting point and being out of the boundary; when an end point of the boundary is a terminal point of a line segment constituting one side of the objective figure, producing a third line which internally divides an interior angle of the objective figure at the end point, and when the end point is not a terminal point of a line segment constituting one side of the objective figure, producing a fourth line by extending a specific side of the base separation figure corresponding to the target contiguous figure, the specific side starting from the end point and being out of the boundary; expanding the base separation figure corresponding to the target contiguous figure by a predetermined width to produce a expanded base separation figure; and producing a linkage figure defined by an outline of the expanded base separation figure, the boundary between the objective figure and the base separation figure corresponding to the target contiguous figure, and at least one of the first through fourth lines.

Thus a linkage figure having a favorable shape is easily produced.

The plurality of base separation figures represent areas to be painted with white ink.

The present invention is also directed to a method of modifying a base separation figure to be painted with a specific base color ink, the method comprising the steps of: (a) providing original figure data representing a plurality of original figures adjacent to each other and base separation figure data representing a plurality of base separation figures corresponding to the plurality of original figures, each base separation figure representing an area laid under the corresponding original figure and being produced by at least one of contraction process and expansion process of a corresponding original figure; (b) obtaining a logical sum of the plurality of original figures to produce a first intermediate figure; (c) contracting the first intermediate figure by a predetermined width to produce a second intermediate figure; and (d) obtaining a logical sum of the second intermediate figure and the plurality of base separation figures to produce a modified base separation figure.

This method can simultaneously modify contracted base separation figures and expanded base separation figures to have a desirable shape.

The present invention is further directed to an apparatus for modifying a base separation figure to be painted with a specific base color ink, comprising: a memory for storing original figure data representing a plurality of original figures and base separation figure data representing a plurality of base separation figures corresponding to the plurality of original figures, each base separation figure representing an area laid under the corresponding original figure; means for selecting an original figure to which a corresponding base separation figure is produced by contracting the original figure, and determining the selected original figure as an objective figure; means for successively extracting one of the plurality of original figures which is adjacent to the objective figure, and determining the extracted original figure as a target contiguous figure to be processed; processing means for, when an outline of the target contiguous figure is in contact with an outline of the objective figure, producing a first intermediate figure by obtaining a logical sum of the objective figure and the target contiguous figure, producing a second intermediate figure by contracting the first intermediate figure by a predetermined width, producing a third intermediate figure by obtaining a logical product of the second intermediate figure and the objective figure, and producing a fourth intermediate figure by obtaining a logical sum of the third intermediate figure and a base separation figure corresponding to the objective figure; and summation means for obtaining a logical sum of a plurality of fourth intermediate figures corresponding to original figures adjacent to the objective figure, to thereby produce a modified base separation figure corresponding to the objective figure.

The present invention is also directed to an apparatus for modifying a base separation figure to be painted with a specific base color ink. The apparatus comprising: a memory for storing original figure data representing a plurality of original figures adjacent to each other and base separation figure data representing a plurality of base separation figures corresponding to the plurality of original figures, each base separation figure representing an area laid under the corresponding original figure and being produced by at least one of contraction process and expansion process of a corresponding original figure; means for obtaining a logical sum of the plurality of original figures to produce a first intermediate figure; means for contracting the first intermediate figure by a predetermined width to produce a second intermediate figure; and means for obtaining a logical sum of the second intermediate figure and the plurality of base separation figures to produce a modified base separation figure.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a flowchart showing a typical routine of generating slip-in figure;

FIGS. 20(A) through 20(D) show a variety of white separation figures; and

DESCRIPTION OF THE PREFERRED EMBODIMENT

A. General Structure and Process of the System

Figure 1:
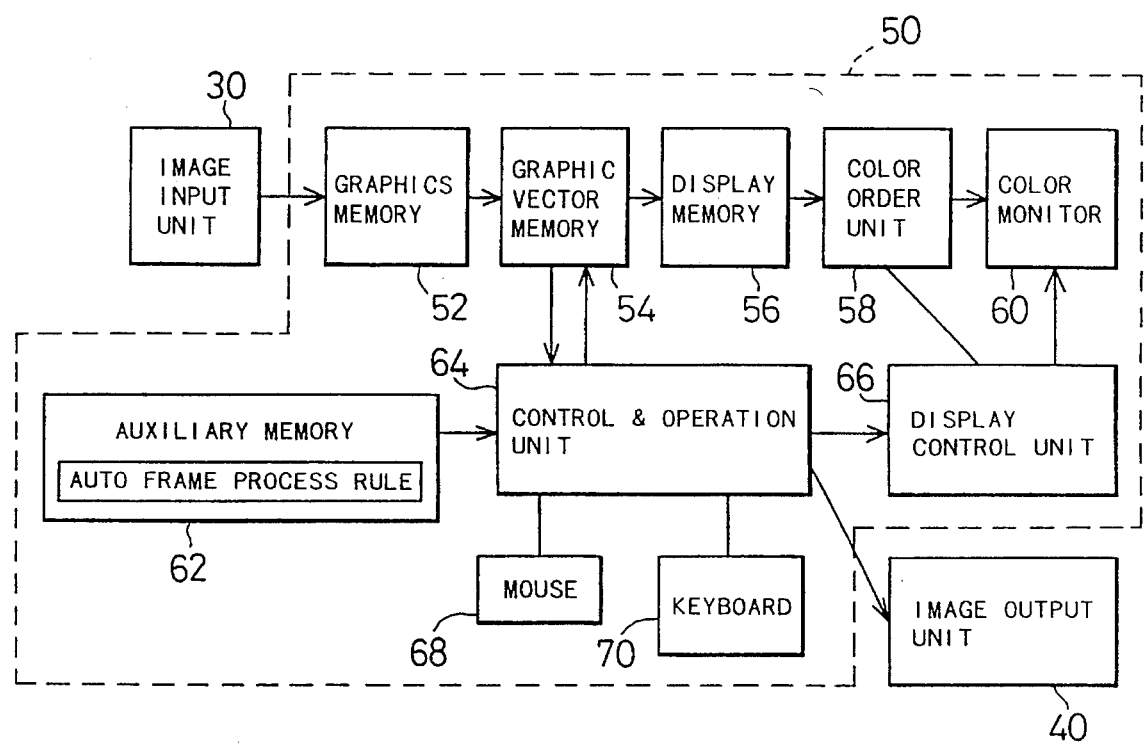
FIG. 1 is a block diagram illustrating a graphics processing system embodying the present invention.

FIG. 1 is a block diagram illustrating the structure of a graphics processing system embodying the present invention. The graphics processing system comprises an image input unit 30, an image output unit 40, and an image processing unit 50. In one preferable embodiment, a reading scanner of a flatbed type and a recording scanner of a drum type are used for the image input unit 30 and the image output unit 40, respectively.

The image processing unit 50 includes a graphics memory 52, a graphic vector memory 54, a display memory 56, a color order unit 58, a color monitor 60, an auxiliary memory 62, a control and operation unit 64, a display control unit 66, a mouse 68, and a keyboard 70. The control and operation unit 64 is a CPU which executes a variety of processes described below according to software programs stored in a ROM or a RAM (not shown). The graphics memory 52, the graphic vector memory 54, and the auxiliary memory 62 are memory areas specifically allocated thereto in a RAM (not shown). The color order unit 58 functions as a color palette.

Figure 2:
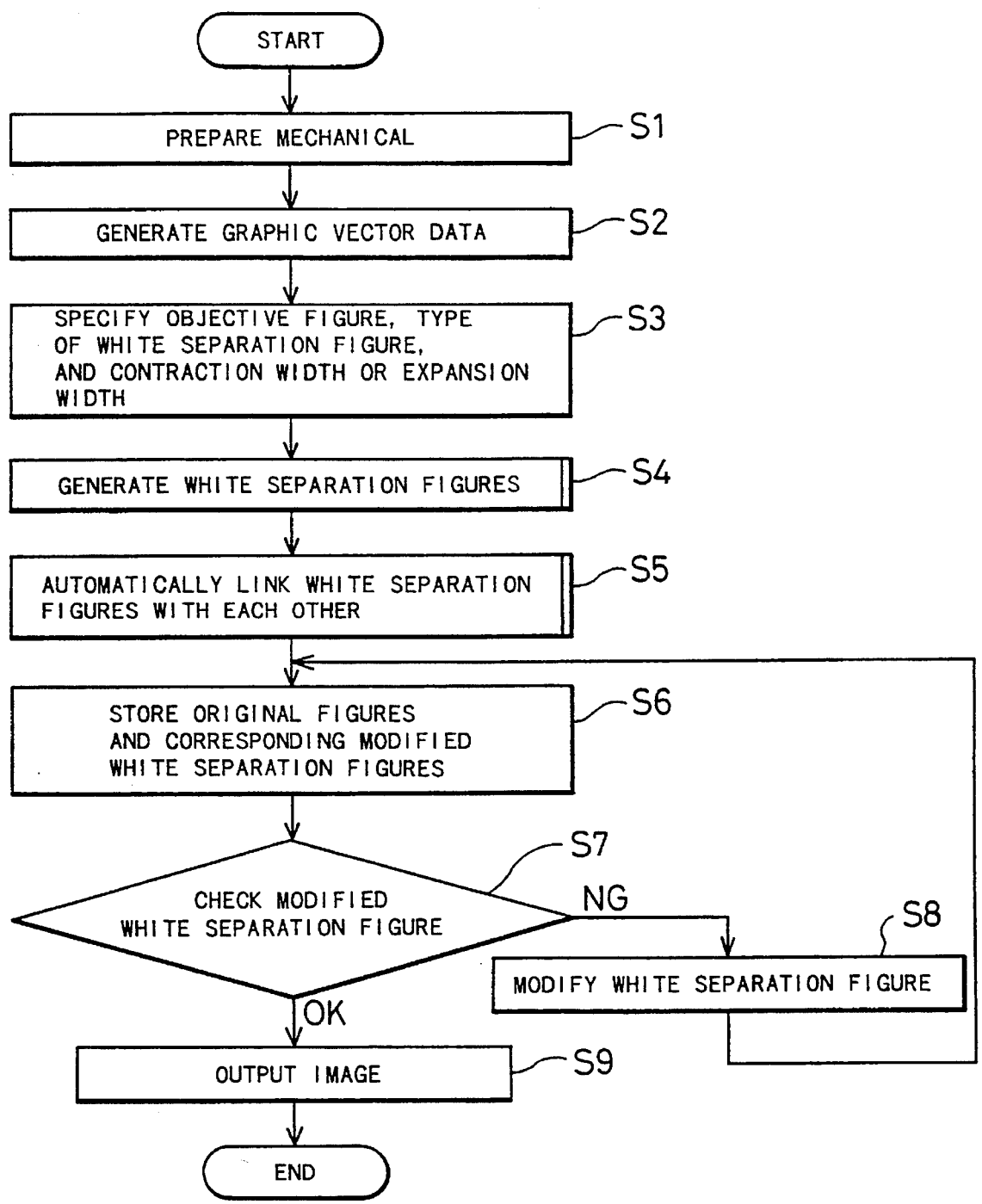
FIG. 2 is a flowchart showing a general flow of a figure modification process executed in the embodiment.
Figure 3A:
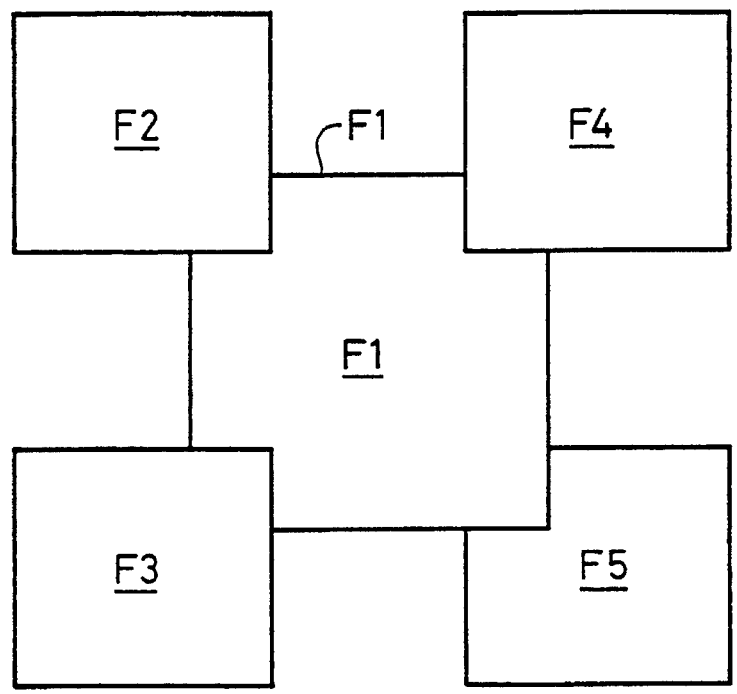
FIGS. 3(A) and 3(B) illustrate part of the figure modification process in the embodiment.
Figure 3B:
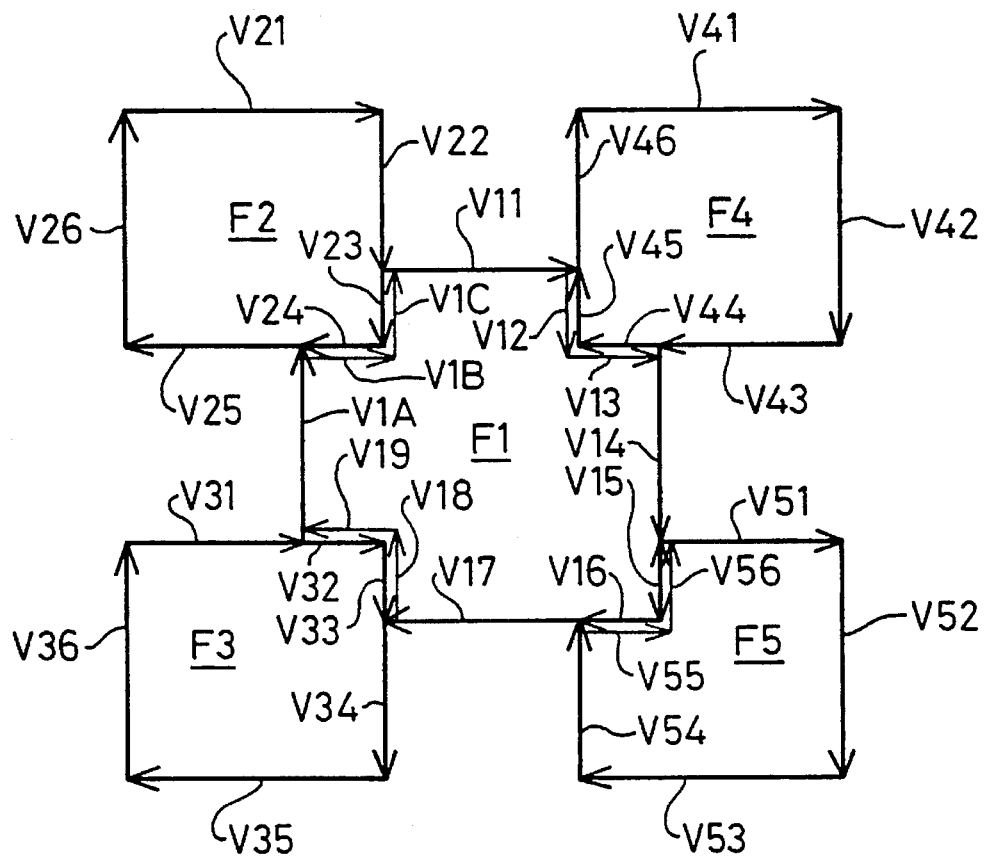

FIG. 2 is a flowchart showing a general flow of a figure modification process executed in the embodiment, and FIGS. 3(A) and 3(B) illustrate part of the figure modification process. At step S1, a mechanical including a plurality of figures, for example, five figures F1 through F5 as shown in FIG. 3(A), is prepared. Graphic data representing the figures drawn on the mechanical are captured by the image input unit 30 and stored in the graphics memory 52. The graphic data are constructed as run length data or bit map data.

At step S2, the control and operation unit 64 converts the graphic data stored in the graphics memory 52 to graphic vector data. FIG. 3(B) shows graphic vector data which express the figures F1 through F5 with a plurality of vectors. The first figure F1 is defined by twelve vectors V11 through V19 and V1A through V1C. The second figure F2 are defined by vectors V21 through V26, the third figure F3 by vectors V31 through V36, the fourth figure F4 by vectors V41 through V46, and the fifth figure F5 by victors V51 through V56, respectively. The right hand side of the second figure F2 is defined by the two vectors V22 and V23, which are separated from each other at an intersection of the upper side of the first figure F1 and the right hand side of the second figure F2. In a similar manner, a vector representing an intersecting side of each figure is divided into two vectors at an intersection of the sides of two figures.

Figure 4:
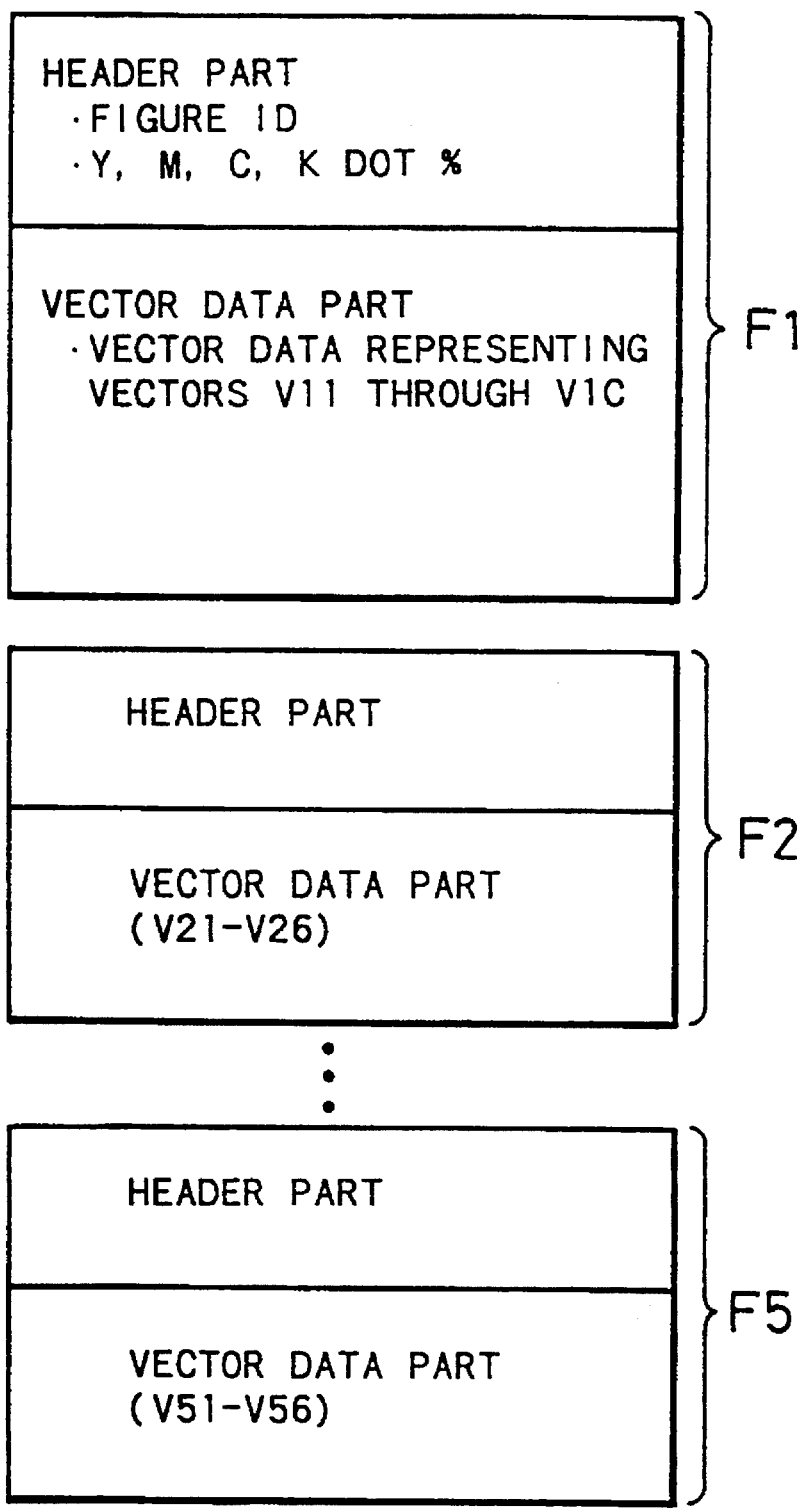
FIG. 4 conceptually shows the structure of graphic vector data.

FIG. 4 conceptually shows the structure of the graphic vector data. Each graphic vector data includes a header part including a figure identification (ID) and dot percent data of Y (yellow), M (magenta), C (cyan), and K (black) plates, and a vector data part including vector data representing coordinates of a starting point and an end point of each vector. Prior to a coloring process, the dot percent is equal to zero for the Y, M, and C plates and equal to 100% for the K plate. The graphic vector data are stored in the graphic vector memory 54. Colors allocated to the respective figures are not related to the figure modification process in the embodiment, and the coloring process is thus not described here.

At step S3, the operator specifies an objective figure to which a white separation figure is created, and also specifies a type of the white separation figure: a contracted-, an expanded-, or a clipped-type. The operator further specifies a contraction width Wt for the contracted type or a expansion width We for the expanded- and the clipped-type. In this embodiment, the contracted type is specified for both the first and second figures F1 and F2, and the expanded type and the clipped type are specified for the third figure F3 and the fourth figure F4, respectively. The contracted type is specified for the fifth figure F5, and its contraction width is specified to be zero.

An identical contraction width Wt or expansion width We can be specified for all the objective figures. Alternatively different contraction widths or expansion widths can be specified for the respective objective figures. A plurality of objective figures can be selected simultaneously by a well-known area specification method to specify an identical white separation figure type and an identical contraction or expansion width for the selected figures.

Figure 5:
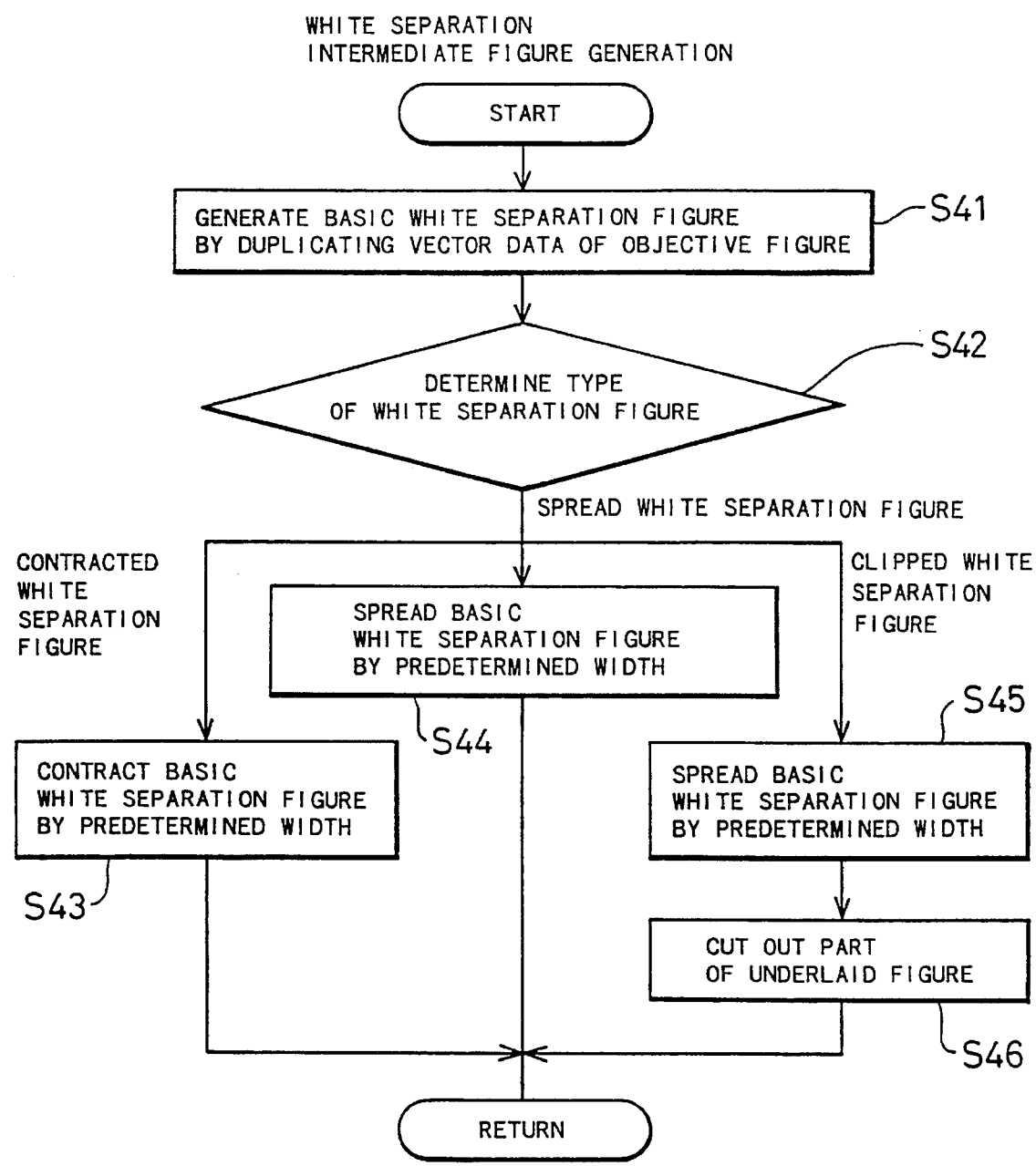
FIG. 5 is a flowchart showing details of step S4 in the flowchart of FIG. 2.

At step S4, a white separation figure is created with respect to each objective figure according to the specification given at step S3. FIG. 5 is a flowchart showing details of step S4. When the program enters the flow of FIG. 5, the control and operation unit 64 selects one objective figure and duplicates vector data representing the objective figure to generate a figure (hereinafter referred to as basic white separation figure) used as a base of a final white separation figure.

The program then proceeds to step S42 at which the control and operation unit 64 determines the type of the white separation figure corresponding to the objective figure. When the contracted type is specified, the program goes to step S43 at which a contracted white separation figure is generated by thinning the basic white separation figure by the contraction width Wt set at step S3. When the expanded type is specified at step S42, the program goes to step S44 at which a expanded white separation figure is generated by spreading the basic white separation figure by the expansion width We set at step S3. When the clipped type is specified at step S42, the program proceeds to steps S45 and S46 at which a clipped white separation figure is generated: more concretely, the basic white separation figure is expanded by the expansion width We set at step S3 to form a expanded white separation figure at step S45, and the part of an underlaid original figure which overlaps with the expanded white separation figure is cut out at step S46.

In this embodiment, vectors are processed according to a known method generally used in two-dimensional computer graphics, and details of such processing are thereby not described here.

Figure 6:
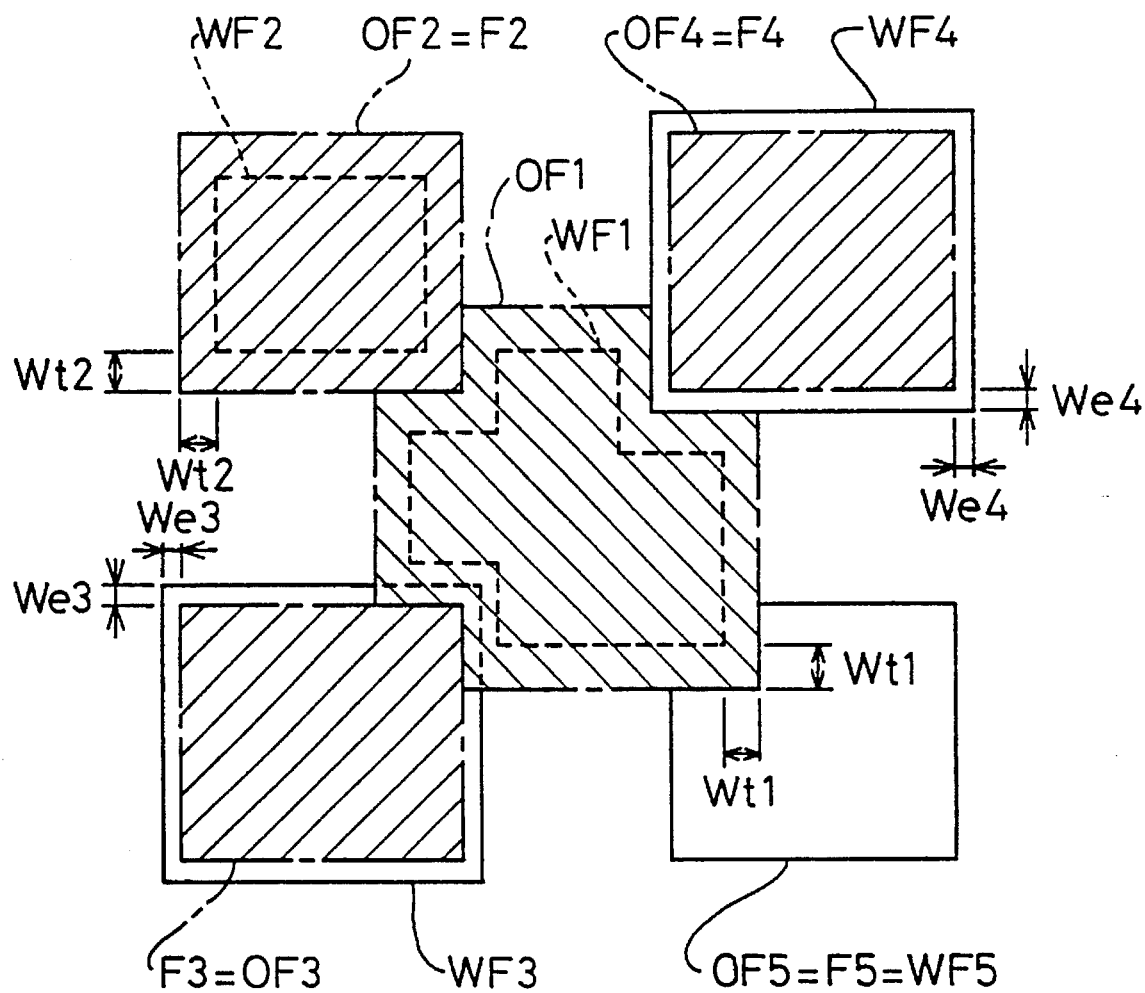
FIG. 6 is a plan view illustrating white separation figures processed in the embodiment.
Figure 7A:
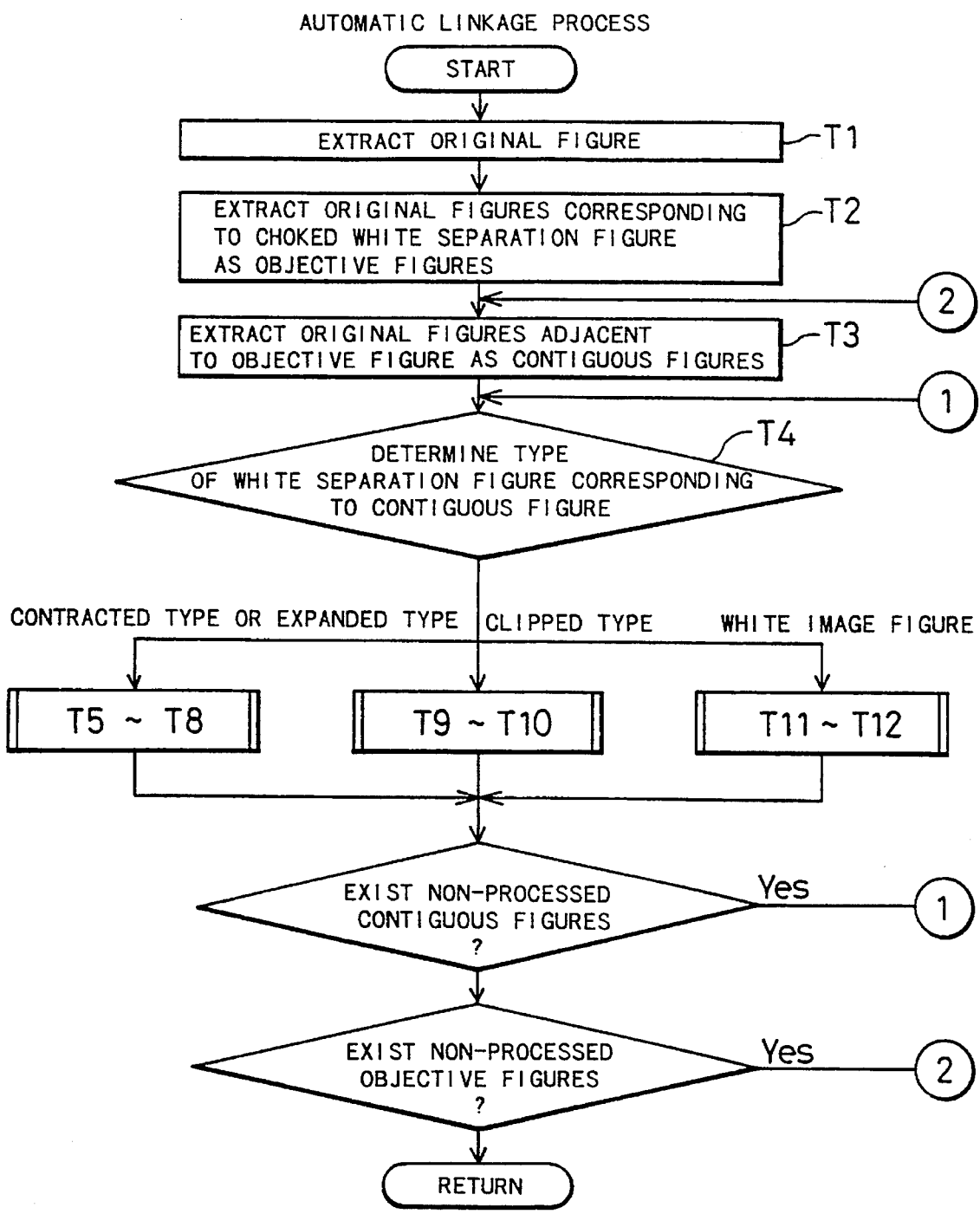
FIGS. 7(A) through 7(D) are flowcharts showing details of a routine of automatically modifying white separation figures.
Figure 7B:
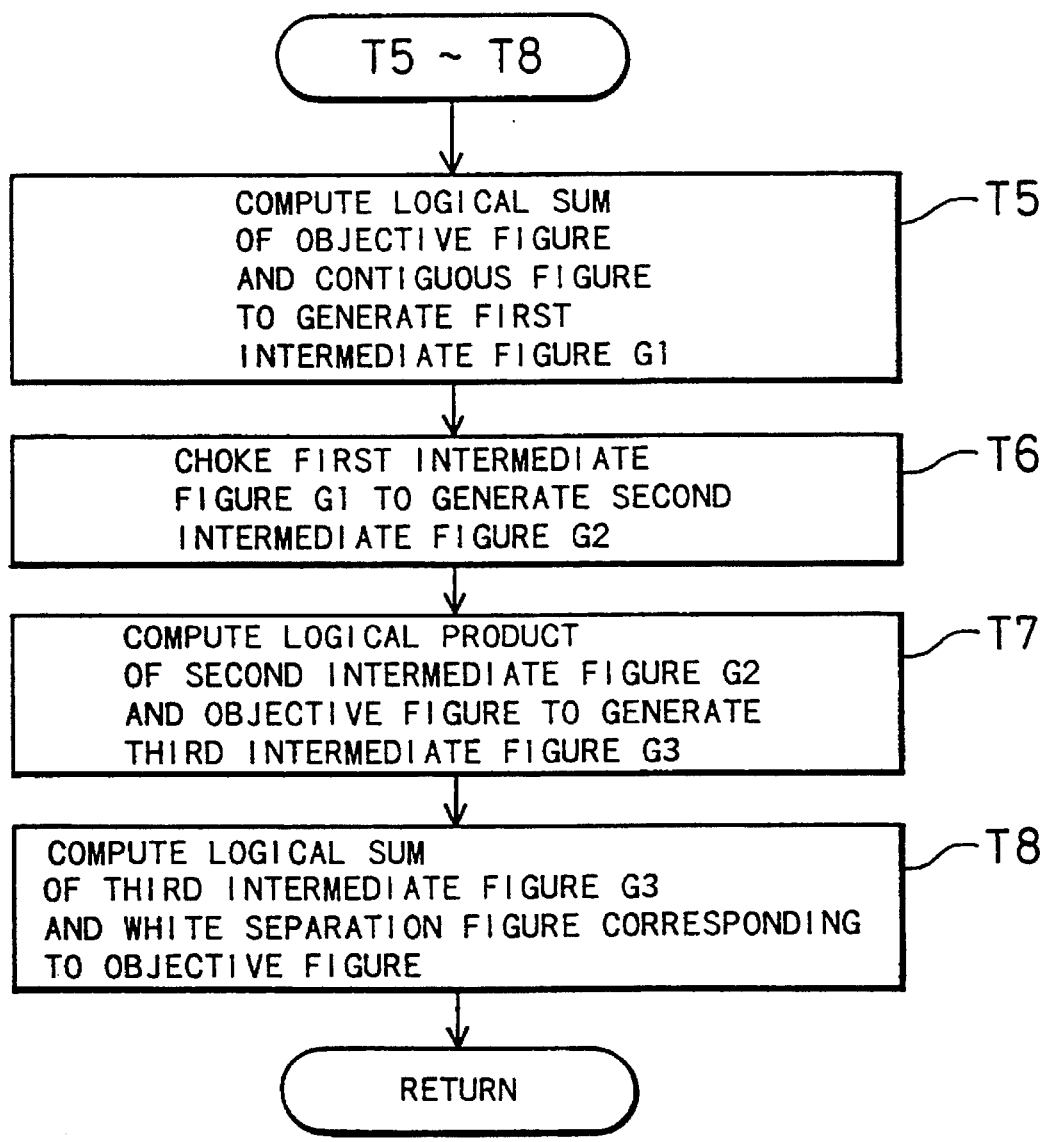
Figure 7C:
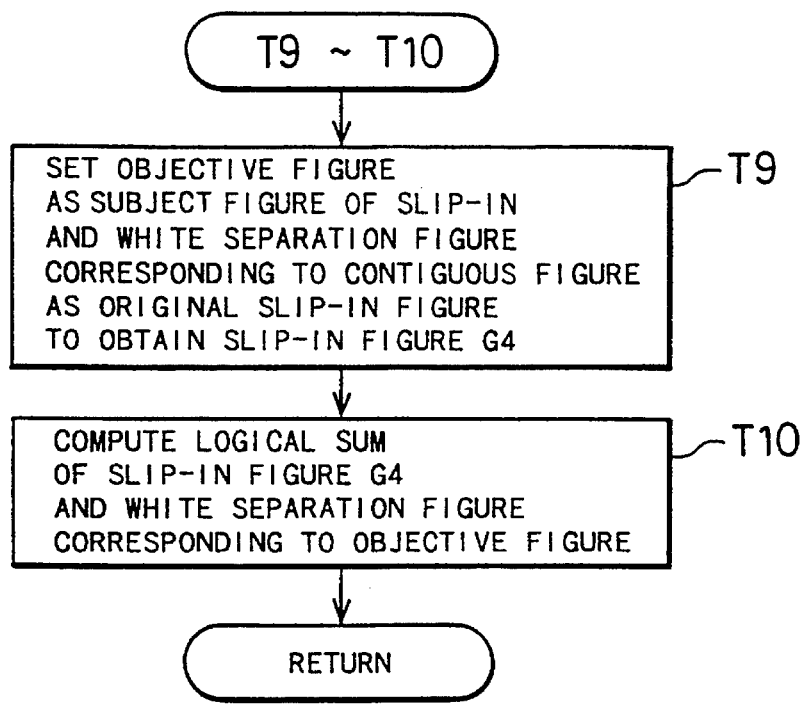
Figure 7D:
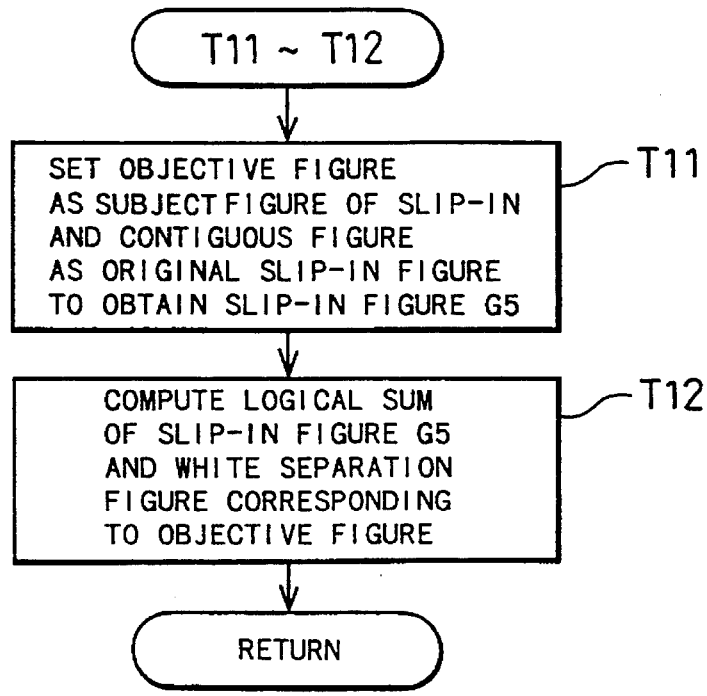

FIG. 6 is a plan view illustrating five original figures OF1 through OF5 and five white separation figures WF1 through WF5 corresponding to the original figures OF1 through OF5, respectively, as results of the processing at step S4.

The second through fifth original figures OF2 through OF5 are identical with the figures F2 through F5 shown in FIG. 3(A). The cutting process executed at step S46 for the clipped white separation figure WF4 results in removal of a right upper corner of the first original figure OF1, thereby making the first original figure OF1 smaller than the first figure F1 of FIG. 3(A) by a predetermined width We4. In the example of FIG. 6, a first contraction width Wt1 for generating the first white separation figure WF1 is identical with a second contraction width Wt2 for generating the second white separation figure WF2. A expansion width We3 for generating the third white separation figure WF3 is identical with the predetermined width We4 for generating the fourth white separation figure WF4.

Since a white separation figure WF5 for the fifth original figure OF5 is generated with the contraction width equal to zero, they are identical with each other. Such a white separation figure is used for reproducing a white translucent area on a transparent soft wrapping material. The white separation figure WF5 may alternatively be generated by setting the expansion width equal to zero for the fifth original figure OF5.

With referring again to FIG. 2, after completion of the processing at step S4, the program goes to step S5 at which automatic linking process, or figure modification process, is executed for the white separation figures. The processing executed at step S5 will be described later in detail.

At step S6, the original figures OF1 through OF5 and the corresponding white separation figures after modification are stored with information regarding the relationship between the original figures and the white separation figures. In a concrete process, the original figures OF1 through OF5 and the modified white separation figures are respectively expressed by graphic vector data shown in FIG. 4. Figure IDs of the white separation figures are registered respectively in header parts of graphic vector data representing the original figures OF1 through OF5.

At step S7, an image including the modified white separation figures is displayed on the color monitor 60. The operator determines whether further modification is required for the displayed white separation figures. When further modification is required, the program goes to step S8 at which the operator modifies the figures by specifying an area to be modified with the mouse 68. When no further modification is required, the program proceeds to step S9 at which the image output unit 40 outputs a final graphic image.

B. Detailed Process of Automatic Linkage of White Separation Figures

FIG. 7 is a flowchart showing details of the automatic linkage process of white separation figures executed at step S5 of FIG. 2. At step T1, all the original figures to which white separation figures are generated are extracted from all of the original figures. In the example of FIG. 6, white separation figures are generated for all of the five graphics, and therefore the five original figures OF1 through OF5 are thus extracted at step T1.

The program then goes to step T2 at which original figures corresponding to the contracted white separation figures are extracted as objective figures. In the example of FIG. 6, the original figures OF1 and OF2 are extracted as objective figures. The automatic linkage process is executed for each objective figure and original figures adjacent to the objective figure as described below. Since an outline of the contracted white separation figure is positioned inside an outline of the corresponding original figure, there is an observable gap between the contracted white separation figure and an adjacent white separation figure. In order to link each contracted white separation figure with an adjacent white separation figure, the automatic linkage process selects original figures corresponding to the contracted white separation figures as objective figures and executes the process described below.

The processing of step T3 and subsequent steps are executed for each objective figure which is to be successively selected. Processing for the objective figure OF1 is described first.

At step T3, original figures which are adjacent to the objective figure OF1 shown in FIG. 6 are extracted as contiguous figures. A contiguous figure has an outline vector which is identical with one of outline vectors of the objective figure OF1. According to this definition of the contiguous figure, the original figures OF2, OF3, and OF5 are determined to be contiguous figures for the objective figure OF1. Incidentally, outline vectors of the original figures OF1 through OF5 are respectively divided at intersections of outlines of contiguous figures like the outline vectors of the figures F1 through F5 shown in FIG. 3(B). As for the original figure corresponding to the clipped white separation figure, such as the original figure OF4, it is determined as a contiguous figure when the clipped white separation figure is adjacent to the objective figure. This means that the original figure OF4 is also determined to be one of the contiguous figures of the objective figure OF1. The processing of step T3 accordingly extracts the original figures OF2, OF3, OF4, and OF5 as contiguous figures of the objective figure OF1.

At steps T4 through T12, each of the contiguous figures are successively selected as a target contiguous figure and processed. At step T4, the type of the white separation figure corresponding to the selected contiguous figure is found. Since the white separation figure WF2 corresponding to the first contiguous figure OF2 is a contracted type, the program goes to steps T5 through T8. FIGS. 8(A) through 8(D) show the process executed at steps T5 through T8 for the first contiguous figure OF2 of the objective figure OF1.

Figure 8A:
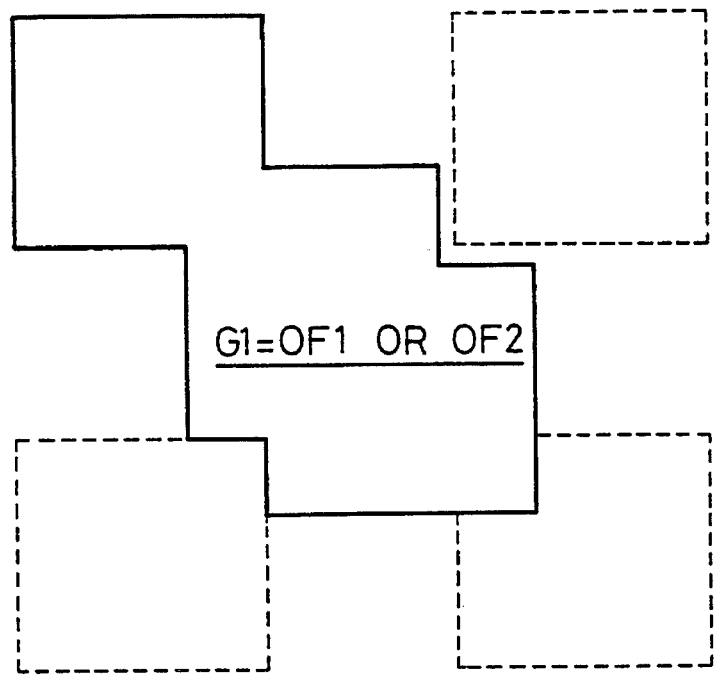
FIGS. 8(A) through 8(D) show processes executed at steps T5 through T8 in the flowchart of FIG. 7 for a first contiguous figure OF2 adjacent to an objective figure OF1.

At step T5, a first intermediate figure G1 is generated by computing a logical sum (OR) of the objective figure and the target contiguous figure (see FIG. 8(A)). The expression in the brackets '(OF1, OF2)' attached to the first intermediate figure G1 in the drawing of FIG. 8(A) shows that the first intermediate figure G1 corresponds to the objective figure OF1 and the target contiguous figure OF2. The similar expressions below denote the similar meanings.

Figure 8B:
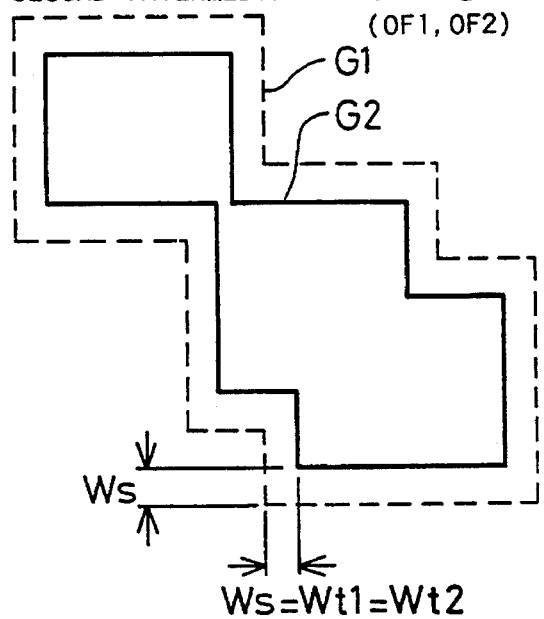

At step T6, a second intermediate figure G2 is generated by thinning the first intermediate figure G1 by a predetermined contraction width Ws (see FIG. 8(B)). In the example of FIG. 8(B), the predetermined contraction width Ws is set equal to the contraction widths Wt1 and Wt2 for the contracted white separation figures WF1 and WF2 for the reasons given later.

Figure 8C:
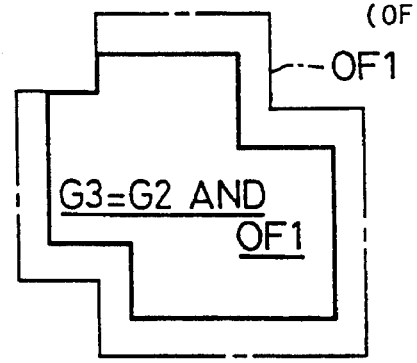
Figure 8D:
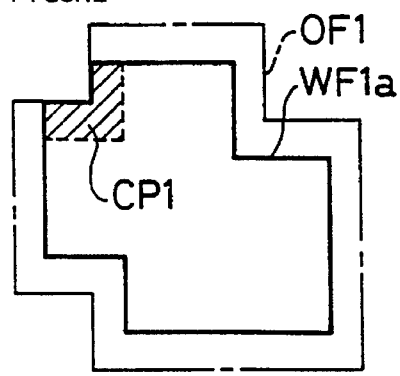

At step T7, a third intermediate figure G3 is generated by computing a logical product (AND) of the second intermediate figure G2 and the objective figure (see FIG. 8(C)). The program then proceeds to step T8 at which a modified white separation figure is obtained by computing a logical sum of the white separation figure corresponding to the objective figure and the third intermediate figure G3 (see FIG. 8(D)). The modified white separation figure WF1a shown in FIG. 8(D) is generated through the single modification process of the original white separation figure WF1 and is thus identical with the third intermediate figure G3 shown in FIG. 8(C). Compared with the contracted white separation figure WF1, the modified white separation figure WF1a includes an additional linkage area CP1, filled with slant lines in FIG. 8(D), which is in intimate contact with the first contiguous figure OF2.

Although the predetermined contraction width Ws is set equal to the contraction widths Wt1 and Wt2 for the contracted white separation figures WF1 and WF2 in the above example, it can be any value not greater than the contraction widths Wt1 and Wt2. When the predetermined contraction width Ws is set equal to Wt1 and Wt2, however, the modified white separation figure WF1a has a shape modestly modified from the original white separation figure WF1 with the linkage area CP1 added.

With referring again to FIG. 7, after the processing of step T8, the program goes to step T13 at which it is determined whether non-processed contiguous figures still exist or not. In this example, there are four contiguous figures OF2, OF3, OF4, and OF5 with respect to the objective figure OF1. The program thus returns from step T13 to step T4 to start the processing for the second contiguous figure OF3.

Figure 9A:
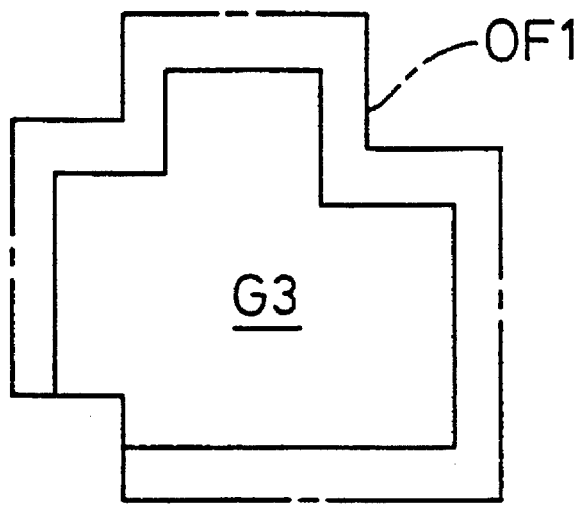
FIGS. 9(A) and 9(B) show processes executed at steps T5 through T8 in the flowchart of FIG. 7 for a second contiguous figure OF3 adjacent to the objective figure OF1.
Figure 9B:
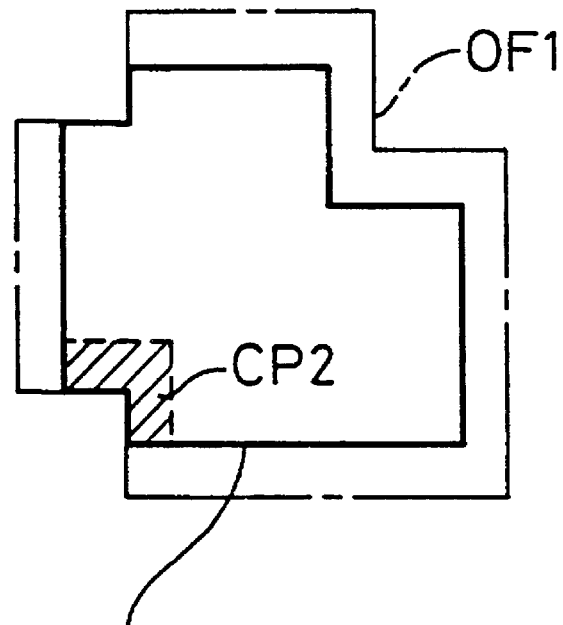

Since the second contiguous figure OF3 of the objective figure OF1 corresponds to an expanded white separation figure WF3 (see FIG. 6), the program repeats the processing of steps T5 through T8. FIGS. 9(A) and 9(B) show the process executed at steps T5 through T8 for the second contiguous figure OF3 of the objective figure OF1. FIG. 9(A) shows a third intermediate figure G3 generated at step T7, and FIG. 9(B) illustrates a modified white separation figure WF1b obtained at step TS. In this processing cycle, the modified white separation figure WF1b is generated at step T8 by computing a logical sum of the third intermediate figure G3 shown in FIG. 9(A) and the modified white separation figure WF1a shown in FIG. 8(D), which is obtained for the first contiguous figure OF2. The modified white separation figure WF1b shown in FIG. 9(B) thus includes a linkage area CP2 filled with slant lines, which is added to the modified white separation figure WF1a shown in FIG. 8(D).

Figure 10A:
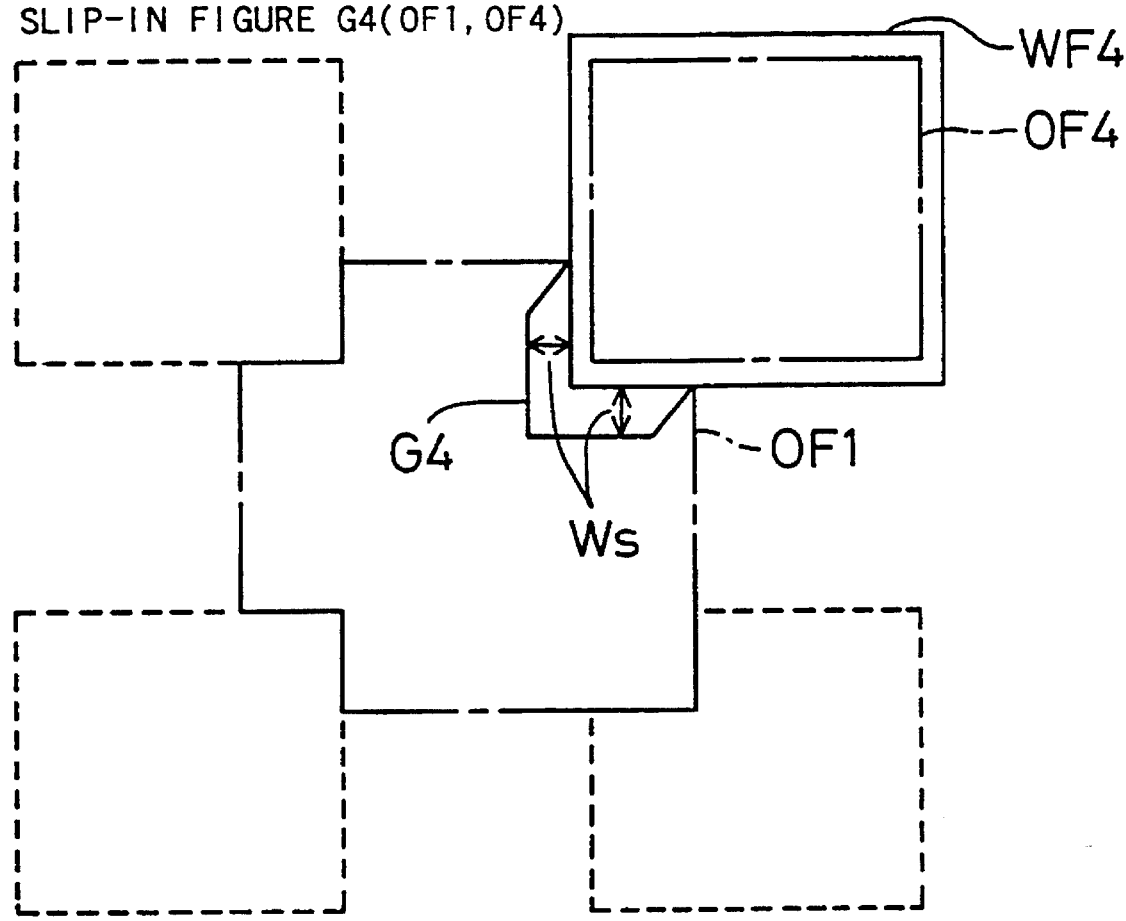
FIGS. 10(A) and 10(B) show processes executed at steps T9 and T10 in the flowchart of FIG. 7 for a third contiguous figure OF4 adjacent to the objective figure OF1.
Figure 10B:
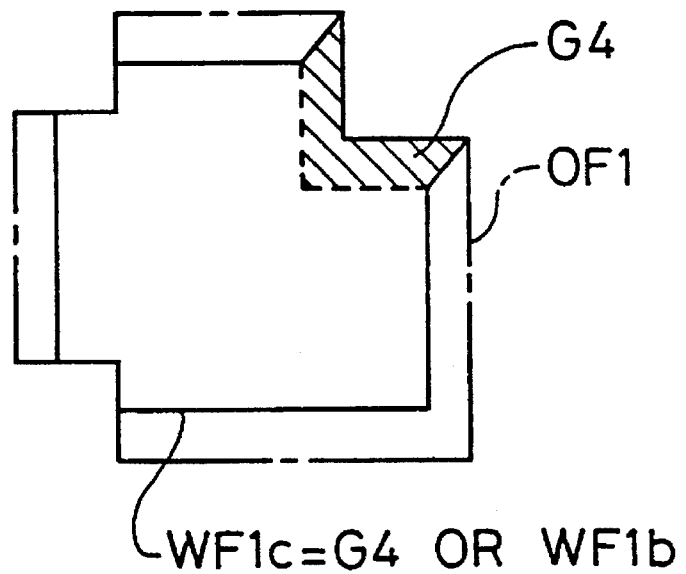

The third contiguous figure OF4 of the objective figure OF1 corresponds to a clipped white separation figure WF4, and the program accordingly goes to steps T9 and T10 in the flowchart of FIG. 7. FIGS. 10(A) and 10(B) show the process executed at steps T9 and T10 for the third contiguous figure OF4 of the objective figure OF1.

At step T9, the objective figure OF1 is set as a subject figure of slip-in while the white separation figure WF4 corresponding to the third contiguous figure OF4 is set as an original slip-in figure, and a slip-in figure G4 shown in FIG. 10(A) is generated. The figure G4 is called "slip-in figure" because it extends from the original slip-in figure WF4 to slip into the subject figure of slip-in OF1. The width of the slip-in figure G4 is set equal to the predetermined contraction width Ws specified at step T6. Both ends of the slip-in figure G4 are defined by inclined sides having an angle of 45 degrees as shown in FIG. 10(A). The process of generating the slip-in figure G4 will be described later in detail.

At step T10, a modified white separation figure WF1c is generated by computing a logical sum of the modified white separation figure WF1b (FIG. 9(B)) for the objective figure OF1 and the slip-in figure G4 (see FIG. 10(B)).

Figure 11A:
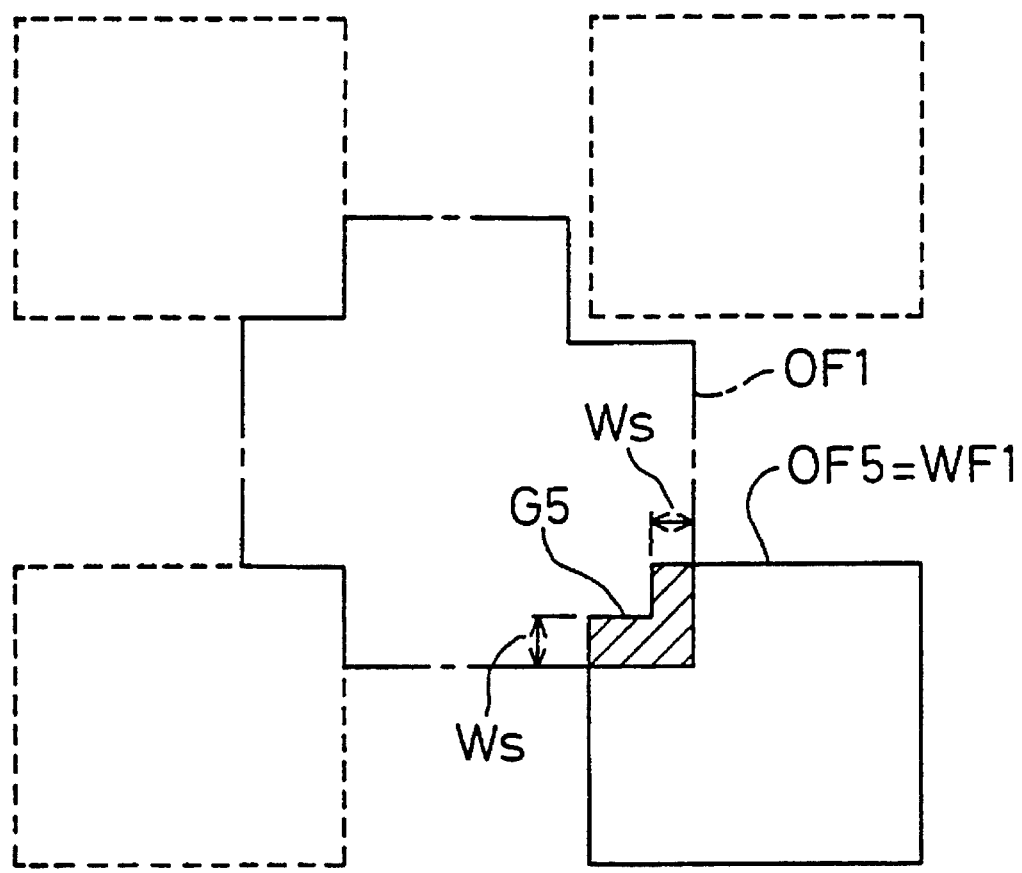
FIGS. 11(A) and 11(B) show processes executed at steps T11 and T12 in the flowchart of FIG. 7 for a fourth contiguous figure OF5 adjacent to the objective figure OF1.
Figure 11B:
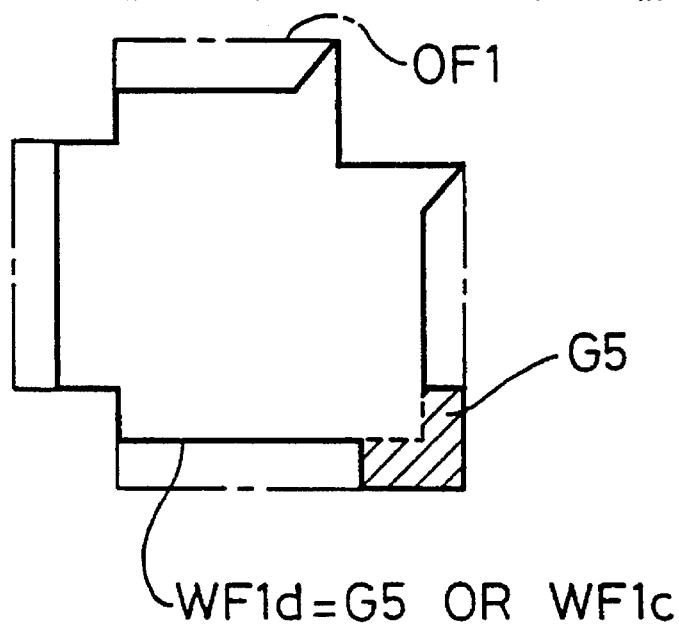

The fourth contiguous figure OF5 of the objective figure OF1 has the same shape as that of the corresponding white separation figure WF5 as shown in FIG. 6. In this case, the program goes to steps T11 and T12 in the flowchart of FIG. 7. FIGS. 11(A) and 11(B) show the process executed at steps T11 and T12 for the fourth contiguous figure OF5 of the objective figure OF1.

At step T11, the objective figure OF1 is set as a subject figure of slip-in while the fourth contiguous figure OF5 is set as a subject figure of slip-in, and a slip-in figure G5 shown in FIG. 11(A) is generated. Since the white separation figure WF5 is the same as the corresponding contiguous figure OF5, the processing of step T11 is substantially equivalent to that of step T9 described above.

At step T12, a modified white separation figure WF1d is obtained by computing a logical sum of the modified white separation figure WF1c (FIG. 10(B)) for the objective figure OF1 and the slip-in figure G5 (see FIG. 11(B)).

Figure 12:
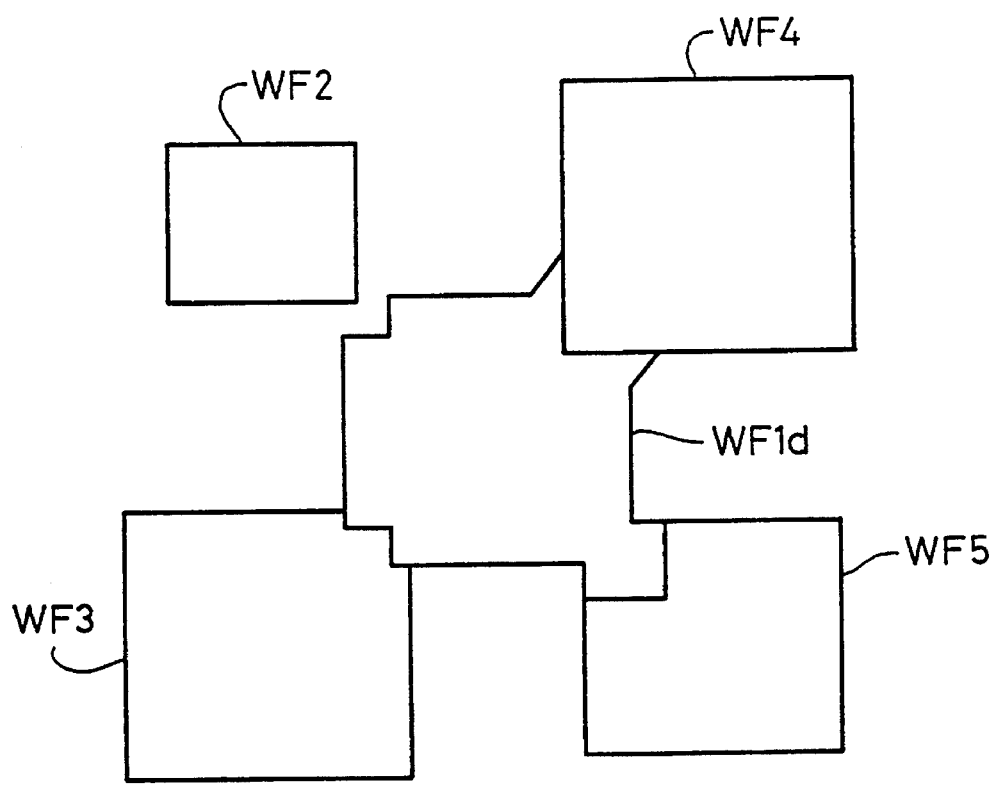
FIG. 12 is a plan view showing a modified white separation figure WF1d generated for the objective figure OF1 and other white separation figures.

FIG. 12 is a plan view showing the final modified white separation figure WF1d for the objective figure OF1 along with other white separation figures. The modified white separation figure WF1d is in intimate contact with the three white separation figures WF3, WF4, and WF5. Although the modified white separation figure Wf1d is a little apart from the white separation figure WF2, the gap originally existing between the two contracted white separation figures WF1 and WF2 shown in FIG. 6 is reduced by the additional linkage area CP1 included in the modified white separation figure WF1d as shown in FIG. 8(D). The linkage between the modified white separation figure WF1d with the contracted white separation figure WF2 is completed by executing the processing of FIG. 7 for the contracted white separation figure WF2 to modify the same.

When it is determined that any of the objective figures extracted at step T2 remains non-processed at step T14 in the flowchart of FIG. 7, the program returns to step T3 to repeat the processing of steps T3 through T13.

As for the second objective figure OF2, only one contiguous figure OF1 is extracted at step T3 in the flowchart of FIG. 7. Since the white separation figure WF1 corresponding to the contiguous figure OF1 is a contracted type, the program goes to steps T5 through T8.

Figure 13:
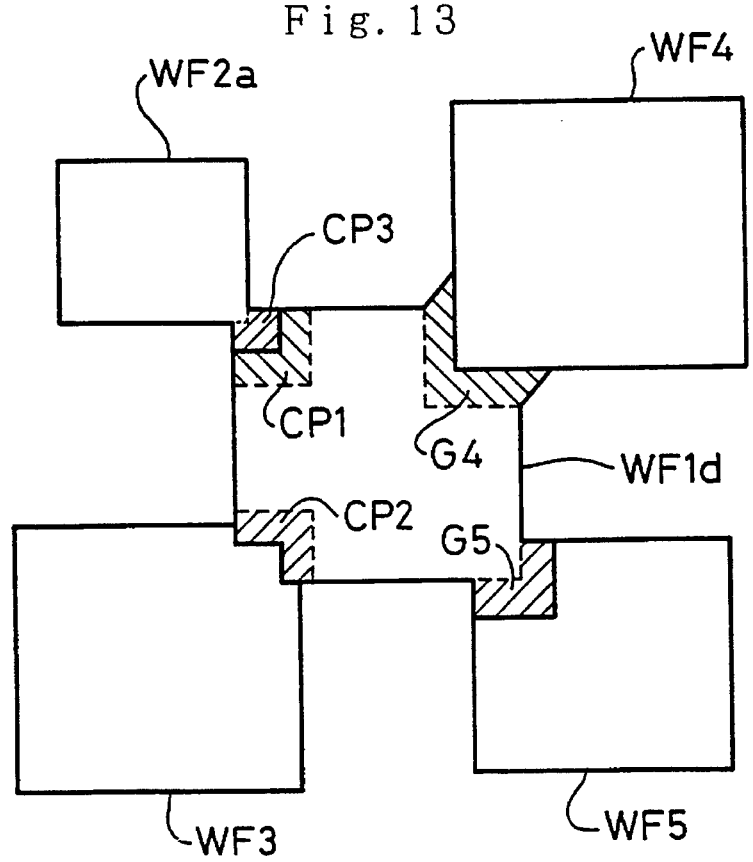
FIG. 13 is a plan view showing a modified white separation figure WF2a generated for another objective figure OF2 and other white separation figures.

FIG. 13 is a plan view showing a modified white separation figure WF2a obtained for the second objective figure OF2 along with other white separation figures. The modified white separation figure WF2a includes a linkage area CP3 added to the original white separation figure WF2.

Completion of the processing for the two objective figures OF1 and OF2 results in linkage of all the white separation figures as shown in FIG. 13. The final white separation figures WF1d, WF2a, WF3, WF4, and WF5 thus generated have shapes similar to those of the original white separation figures shown in FIG. 6 except the additional linkage areas CP1 through CP3 and the slip-in figures G4 and G5. This means that each final white separation figure keeps a favorable shape which is not greatly different from its original shape.

C. Process of Generating Slip-in Figure

As described above, the slip-in figures G4 and G5 are generated respectively at steps T9 and T11 in the flowchart of FIG. 7. FIG. 14 is a flowchart showing the procedure of generating a slip-in figure. Generation of the slip-in figure G4 shown in FIG. 10(B) and the slip-in figure G5 shown in FIG. 11(B) is described below by way of example.

Figure 15A:
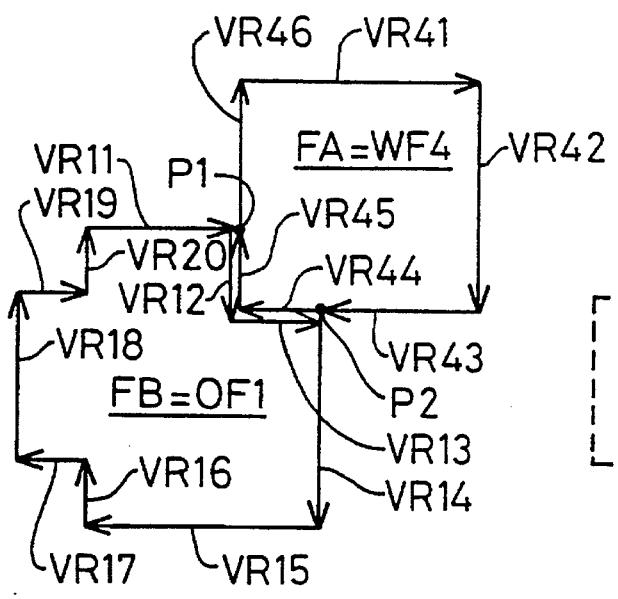
FIGS. 15(A) through 15(D) illustrate a primary process of generating an slip-in figure G4.

FIGS. 15(A) through 15(D) illustrate the generation of the slip-in figure G4 shown in FIG. 10(B). In this example, the clipped white separation figure WF4 and the original figure OF1 respectively correspond to an original slip-in figure FA and a subject figure of slip-in FB as shown in FIG. 15(A).

When the program enters the routine of FIG. 14, a boundary between the original slip-in figure FA and the subject figure of slip-in FB is found first at step TT1. As illustrated in FIG. 15(A), the original slip-in figure FA is defined by six vectors VR41 through VR46 whereas the subject figure of slip-in FB is defined by ten vectors VR11 through VR20. At step TT1, the boundary of the figures FA and FB is determined by extracting overlapping vectors VR44 and VR13, VR45 and VR12 from the vectors of the figures FA and FB. Terminal points P1 and P2 of the boundary, which is defined by the two vectors VR44 and VR45, or VR12 and VR13, correspond to an end point of the vector VR45 and a starting point of the vector VR44.

At step TT2, a first terminal point P1 of the boundary is selected. In the example of FIG. 15(B), the end point of the vector VR45 is selected as the first terminal point P1.

At step TT3, a vector Va=VR45 running along the boundary towards the first terminal point P1 is found, and so is another vector Vb=VR11 running from the subject figure of slip-in FB towards the first terminal point P1. The words 'vector running from the subject figure of slip-in FB towards the first terminal point P1' denote a vector which is not on the boundary between the two figures FA and FB and which is one of the vectors expressing those sides of the figure FB whose end points include the first terminal point P1.

At step TT4, an angle θ defined by the two vectors Va and Vb obtained at step TT3 is compared with 180 degrees. When the angle θ of the two vectors Va and Vb is equal to 180 degrees, the program goes to step TT6. When the angle θ of the two vectors Va and Vb is not equal to 180 degrees, on the other hand, the program goes to step TT5.

In the example of FIG. 15(B), the angle θ of the two vectors Va and Vb is not equal to 180 degrees but equal to 90 degrees. The program thereby goes to step TT5, at which half the angle θ (=45 degrees) of the two vectors Va and Vb is set as a relief angle θ1 of the first terminal point P1.

The program then goes to step TT7 at which a second terminal point P2 of the boundary is selected and the processing of steps TT3 through TT6 is repeated for the second terminal point P2. As shown in FIG. 15(C), an angle θ defined by a first vector Va=VR13 running along the boundary towards the second terminal point P2 and a second vector Vb=–VR14 running from the subject figure of slip-in FB towards the second terminal point P2 is equal to 90 degrees, and a relief angle θ2 of the second terminal point P2 is set equal to 45 degrees.

Figure 15D:
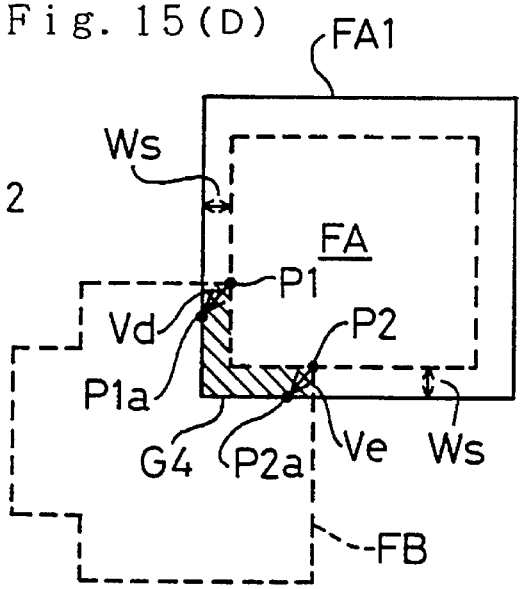
Figure 15B:
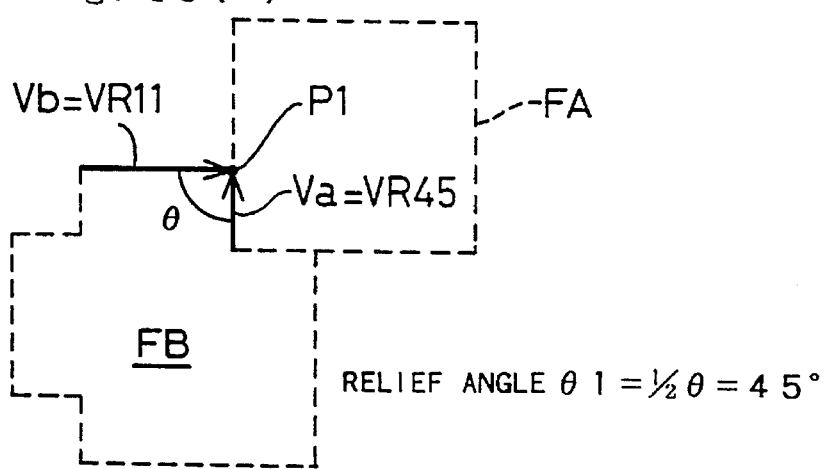
Figure 15C:
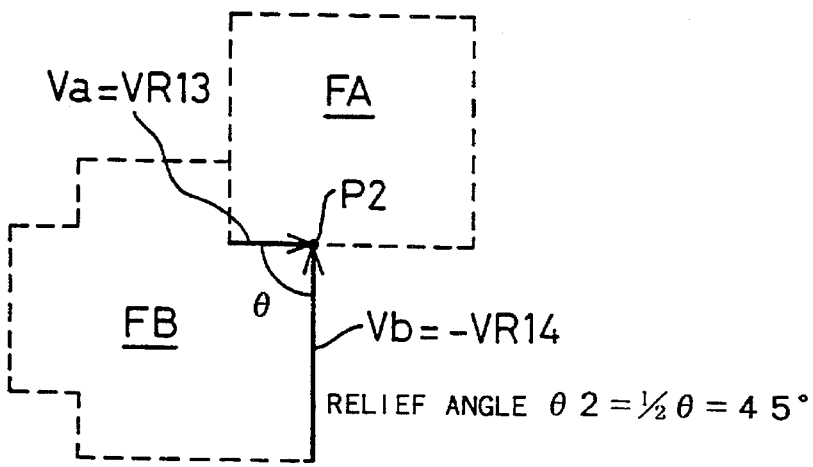

At step TT8, an expanded figure FA1 is generated by spreading the original slip-in figure FA by a predetermined width Ws as shown in FIG. 15(D). The program then proceeds to step TT9 at which vectors are drawn straight from the first and the second terminal points P1 and P2 in the direction of the relief angles θ1 and θ2 of the respective terminal points, respectively, and thereby first and second intersections P1a and P2a of the straight vectors and the expanded figure FA1 are found. At step TT10, a vector Vd connecting the first terminal point P1 with the first intersection P1a and another vector Ve connecting the second terminal point P2 with the second intersection P2a are generated.

The program subsequently goes to step TT11 at which the slip-in figure G4 is generated. The slip-in figure G4 is the polygon which is defined by the boundary between the two figures FA and FB, the two vectors Vd and Ve, and part of the expanded figure FA1 and which exists inside the subject figure of slip-in FB.

Figure 16A:
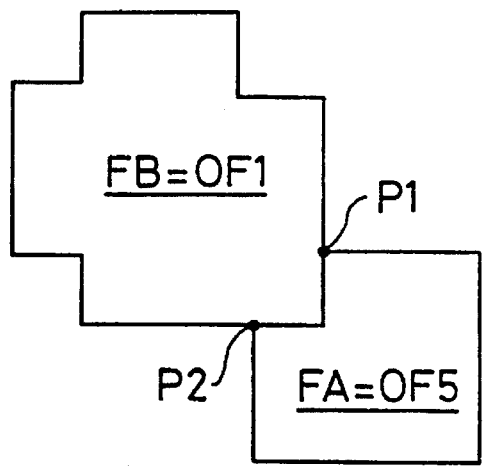
FIGS. 16(A) through 16(E) illustrate a primary process of generating another slip-in figure G5.
Figure 16B:
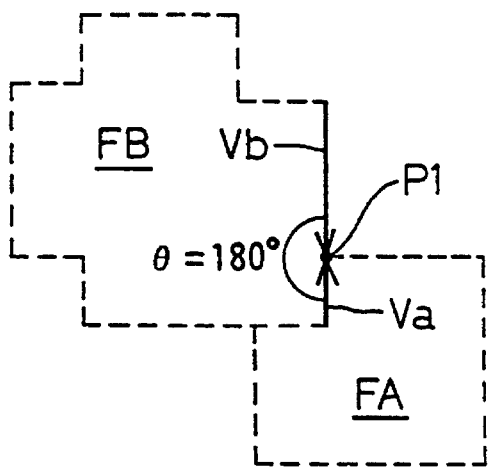
Figure 16C:
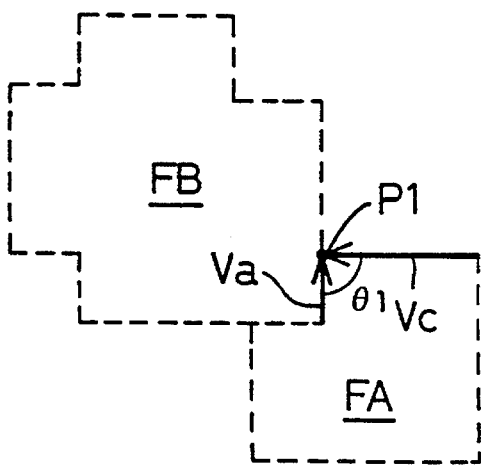

FIGS. 16(A) through 16(E) illustrate the generation of the slip-in figure G5 shown in FIG. 11(B). As illustrated in FIG. 16(A), the fifth original figure OF5 and the first original figure OF1 respectively correspond to an original slip-in figure FA and a subject figure of slip-in FB. FIG. 16(B) shows two vectors Va and Vb obtained for a first terminal point P1 of the boundary between the figures FA and FB at step TT3 in the flowchart of FIG. 14. An angle θ defined by the two vectors Va and Vb is equal to 180 degrees. In such a case, the program goes to step TT6 at which another vector Vc running from the original slip-in figure FA towards the first terminal point P1 is found (see FIG. 16(C)). An angle θ1 defined by the vectors Vc and Va is then set as a relief angle. Such setting of the relief angle places one side of the extended figure on a line extending from the vector Vc as described below.

Figure 16D:
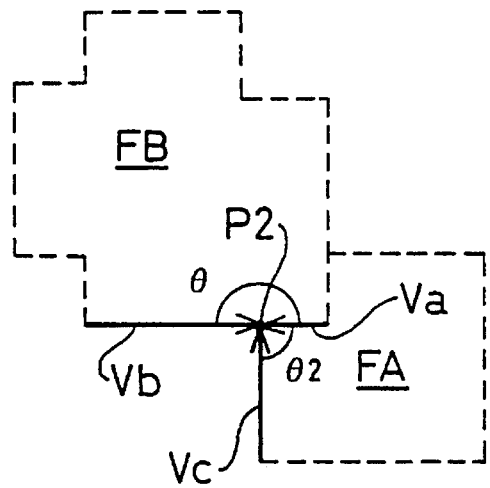

The program then goes to step TT7 to repeat the processing for a second terminal point P2 of the boundary between the two figures FA and FB. Since an angle θ defined by two vectors Va and Vb running towards the second terminal point P2 is also equal to 180 degrees as illustrated in FIG. 16(D), an angle θ2 defined by the vector Va and another vector Vc running from the original slip-in figure FA towards the second terminal point P2 is set as a relief angle.

Figure 16E:
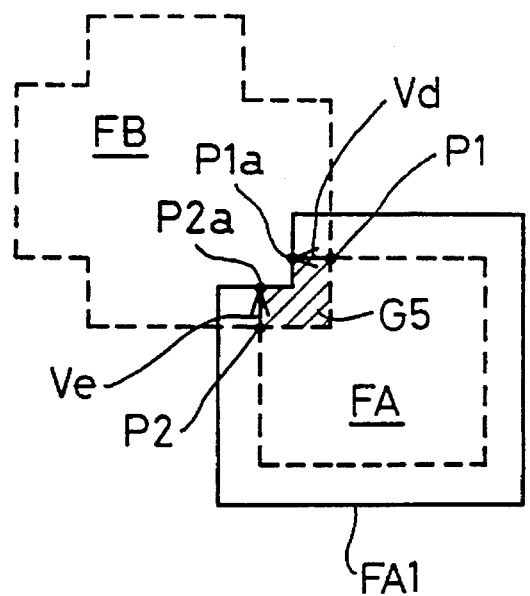

At step TT8, an expanded figure FA1 is generated by spreading the original slip-in figure FA by a predetermined width Ws as illustrated in FIG. 16(E). The program then proceeds to step TT9 at which vectors are drawn straight from the first and the second terminal points P1 and P2 in the direction of the relief angles θ1 and θ2 of the respective terminal points, respectively, and first and second intersections P1a and P2a of the straight vectors and the expanded figure FA1 are found. At step TT10, a vector Vd connecting the first terminal point P1 with the first intersection P1a and another vector Ve connecting the second terminal point P2 with the second intersection P2a are generated.

The program subsequently goes to step TT11 at which the slip-in figure G5 is generated. The slip-in figure G5 is the polygon which is defined by the boundary between the two figures FA and FB, the two vectors Vd and Ve, and part of the expanded figure FA1 and which exists inside the subject figure of slip-in FB.

Figure 17A:
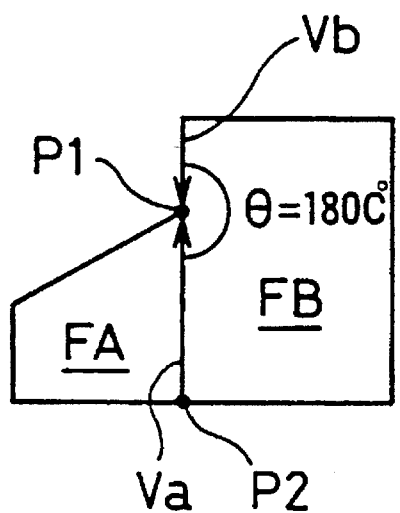
FIGS. 17(A) through 17(C) illustrate a primary process of generating still another extended figure.
Figure 17B:
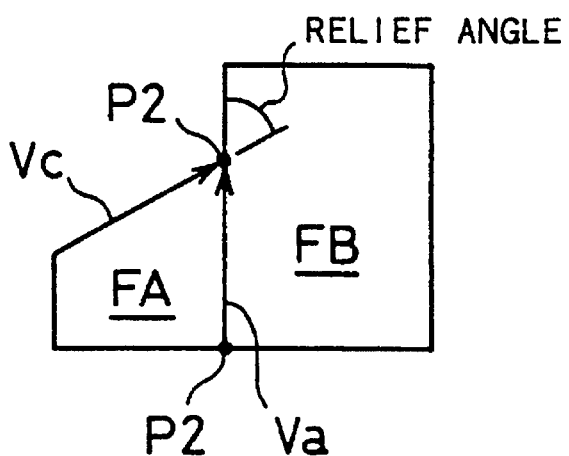
Figure 17C:
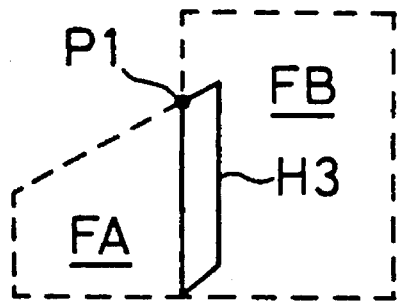

FIGS. 17(A) through 17(C) illustrate the generation of still another slip-in figure. In the example of FIG. 17(A), an angle θ defined by the two vectors Va and Vb for the first terminal point P1 of the boundary is equal to 180 degrees. The program accordingly goes to step TT6 in the flowchart of FIG. 14 at which an angle defined by the vectors Va and Vc is set as a relief angle (FIG. 17(B)). This means that one side of a slip-in figure is formed on a line extending from the vector Vc. A slip-in figure H3 thus generated has a shape determined by extending the right hand side of the original slip-in figure FA in the right upper direction as illustrated in FIG. 17(C). A figure of a logical sum of the original slip-in figure FA and the extended graphic H3 has a natural, favorable shape.

The process of generating a slip-in figure described above determines a relief angle of a slip-in figure according to the angle of the two vectors Va and Vb for each of the starting point and the end point of the boundary between the original slip-in figure FA and the subject figure of slip-in FB. This realizes a slip-in figure having a natural, favorable shape.

The process of determining the vectors Vd and Ve of the slip-in figure G4 shown in FIG. 15(D) may alternatively be explained as follows. The starting point P1 and the end point P2 of the boundary between the figures FA and FB are considered first. Since the starting point P1 corresponds to a terminal point of one side of the subject figure of slip-in FB, the vector Vd of the slip-in figure passing through the starting point P1 is formed on a line which internally divides an interior angle of the subject figure of slip-in FB at the starting point P1 at the ratio of 1:1. The preferable ratio of the interior division is in the range of 1:2 through 2:1, but 1:1 is especially preferable. The vector Ve passing through the end point P2 of the boundary is determined in a similar manner.

D. Modifications (1) For the processing of the contiguous figures corresponding to contracted white separation figures or expanded white separation figures, steps TT20 through TT22 of FIG. 18 may be executed instead of repeating steps T5 through T8 of FIG. 7. At step TT20, a sixth intermediate figure G6 is generated by computing a logical sum of an objective figure and its contiguous figures which correspond to contracted white separation figures or expanded white separation figures. FIG. 19(A) shows the sixth intermediate figure G6 thus generated for the objective figure OF1.

Figure 19A:
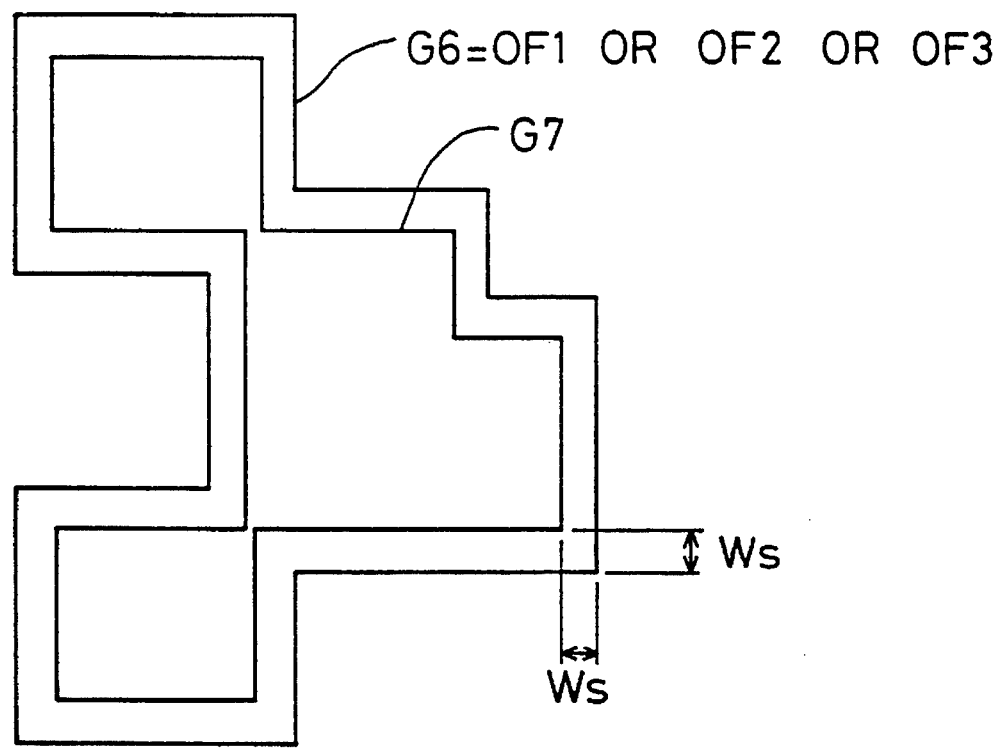
FIGS. 19(A) and 19(B) illustrate a process of correcting a white separation figure according to the flowchart of FIG. 18.
Figure 19B:
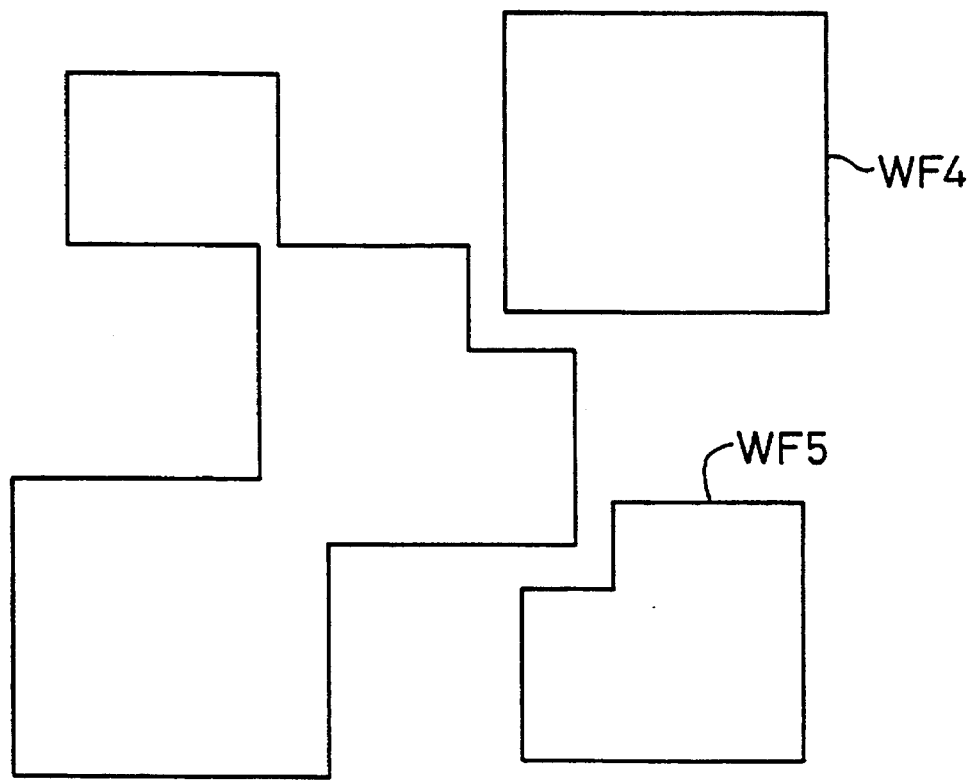
Figure 20A:
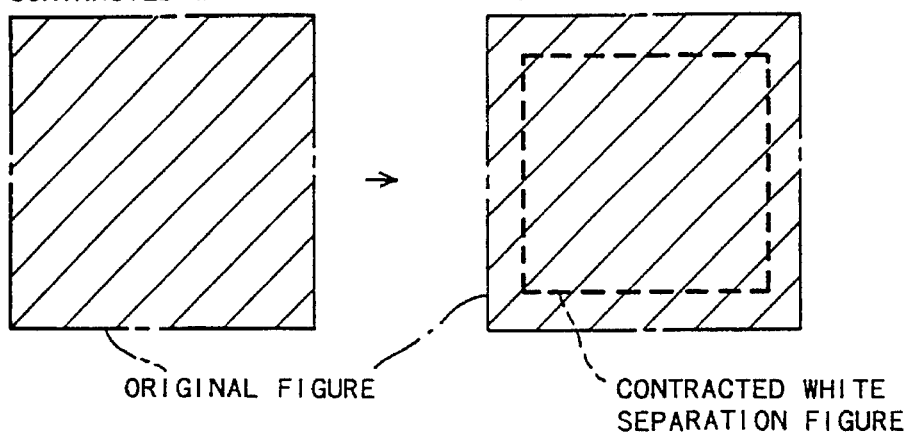
Figure 20B:
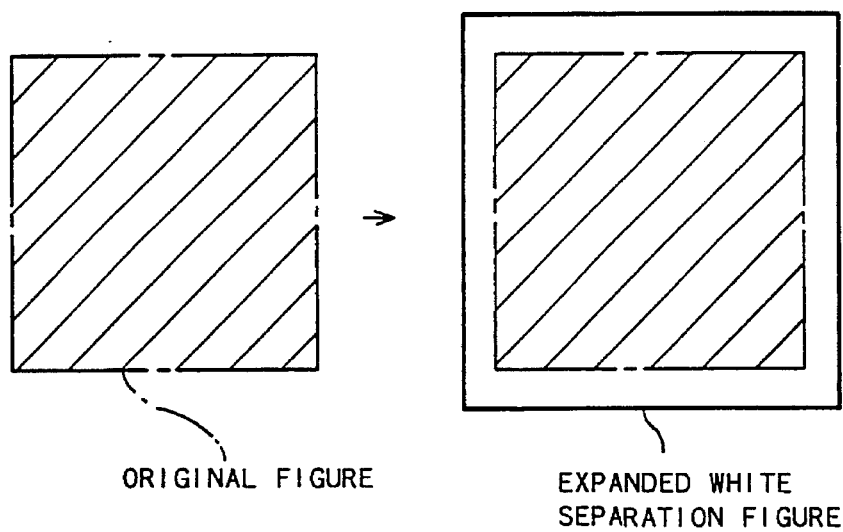
Figure 20C:
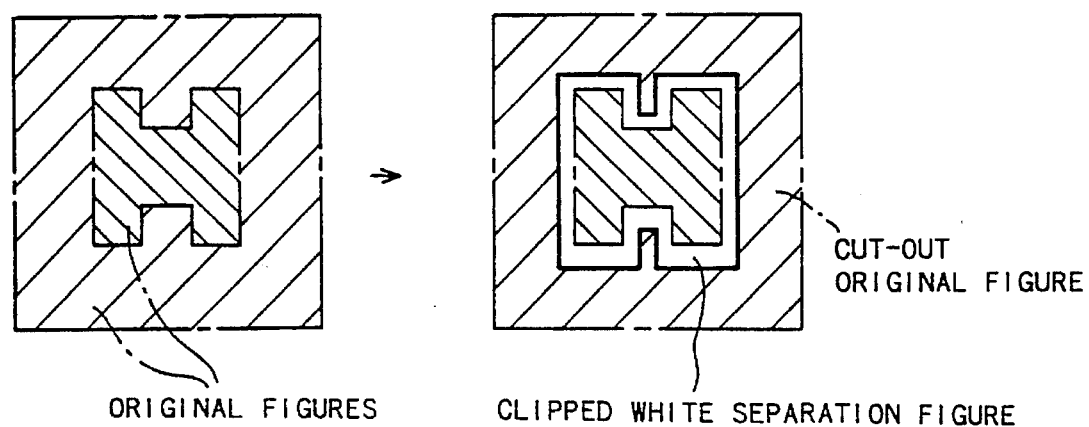
Figure 21:
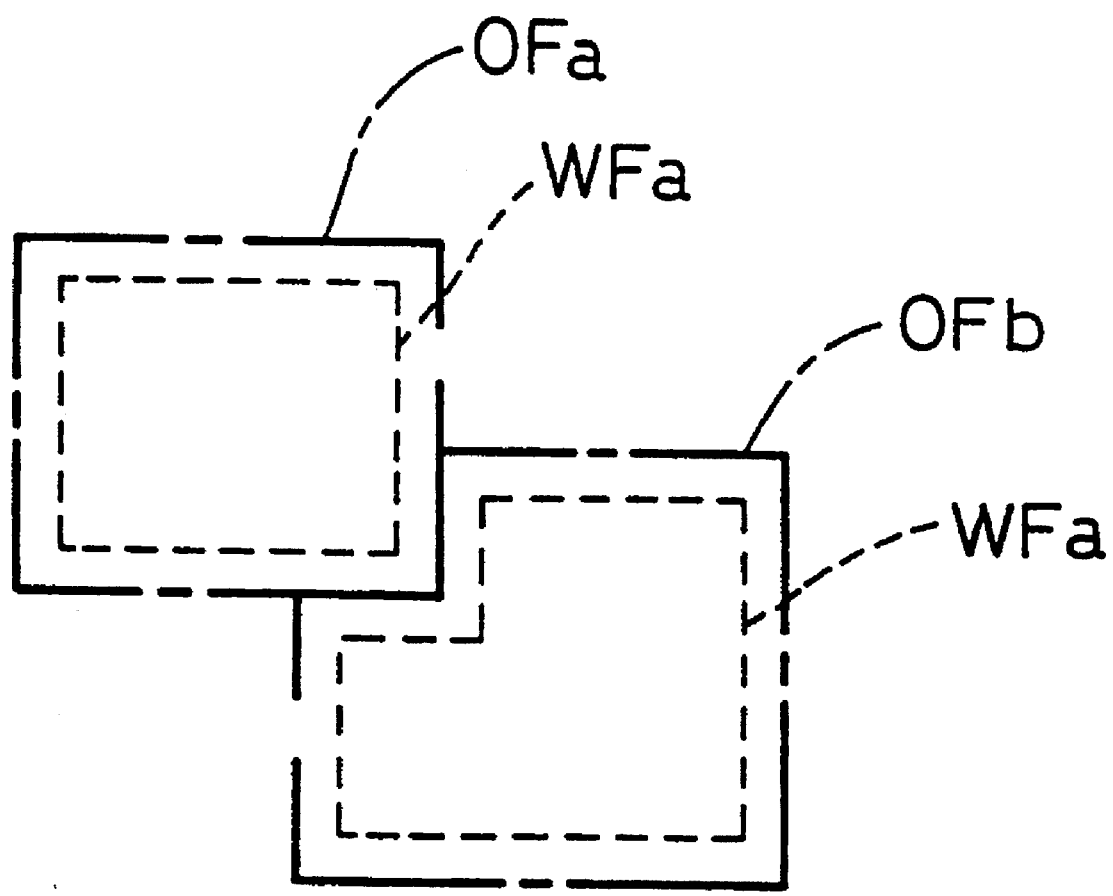
FIG. 21 is a plan view illustrating white separation figures WFa and WFb respectively generated by processing original figures OFa and OFb.

At step TT21, a seventh intermediate figure G7 is generated by choking the sixth intermediate figure G6 by a predetermined width Ws (see FIG. 19(A)). The program then goes to step TT22 at which a modified white separation figure is obtained by computing a logical sum of the seventh intermediate figure G7 and white separation figures WF1, WF2, and WF3 corresponding to the contiguous figures processed at step TT20 (see FIG. 19(B)). The modified white separation figure shown in FIG. 19(B) has a shape obtained by deleting the slip-in figures G4 and G5 from the modified white separation figure shown in FIG. 13. After the modified white separation figure shown in FIG. 19(B) is generated, steps T9, T10, T11, and T12 in the flowchart of FIG. 7 are executed to generate the modified white separation figure WF1d shown in FIG. 13.

Figure 18:
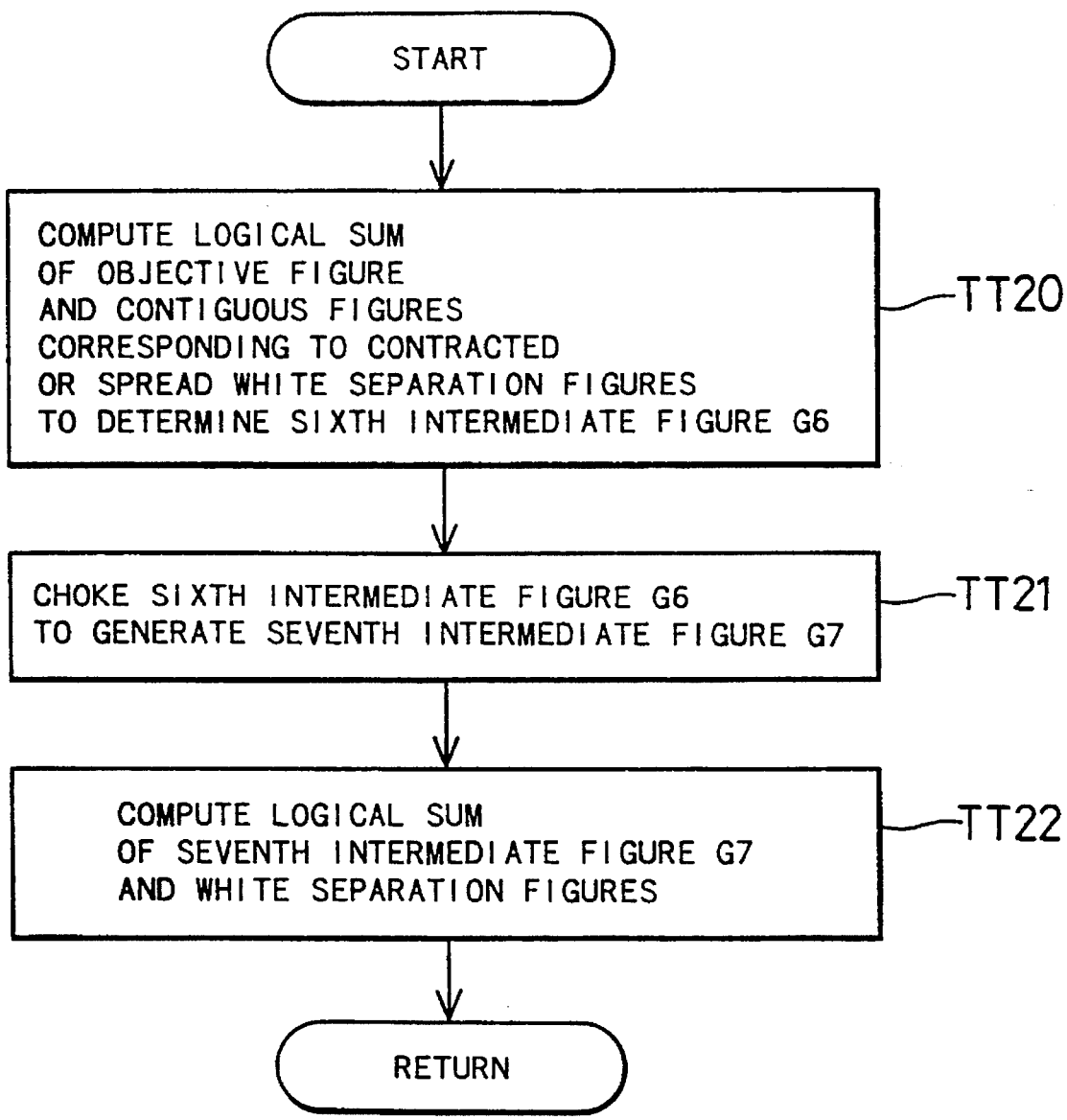
FIG. 18 is a flowchart showing another routine of automatically correcting white separation figures.

The steps shown in FIG. 18 simultaneously process contracted- and expanded-white separation figures, thereby making the processing time preferably shorter. The procedure shown in FIG. 7 successively processing the contiguous figures of the objective figure, on the other hand, has an advantage of being simpler.

Although a variety of figures are defined by processing vector data in the above embodiment, data having other formats, such as bit map data and run length data, can be used for producing the various figures. While vector data allows choking or spreading by a desired width to be executed by a single operation, binary bit map data simplifies the logical operations of the figures.

Although all the figures are rectangles in the above embodiment for the clarity of explanation, the present invention is applicable to any figures of arbitrary shapes.

Although the above embodiment modifies white separation figures, the present invention is also applicable to modify base separation figures for a specific base color ink on which other color separation figures are painted. The color of base color ink can be selected from various colors such as white, silver, and gold.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of modifying a base separation figure to be painted with a specific base color ink, said method comprising the steps of:

(a) providing original figure data representing a plurality of original figures close to each other and base separation figure data representing a plurality of base separation figures corresponding to said plurality of original figures, each base separation figure representing an area laid under the corresponding original figure, at least one of said plurality of base separation figures being produced by contracting a corresponding original figure;

(b) selecting an original figure to which a corresponding base separation figure was produced by contracting said original figure, and determining said selected original figure as an objective figure;

(c) extracting one of said plurality of original figures which is close to said objective figure, and determining said extracted original figure as a target contiguous figure to be processed;

(d) when an outline of said target contiguous figure is in contact with an outline of said objective figure, producing a first intermediate figure by obtaining a logical sum of said objective figure and said target contiguous figure, producing a second intermediate figure by contracting said first intermediate figure by a predetermined width, producing a third intermediate figure by obtaining a logical product of said second intermediate figure and said objective figure, and producing a fourth intermediate figure by obtaining a logical sum of said third intermediate figure and a base separation figure corresponding to said objective figure; and (e) repeating said steps (c) and (d) to produce a plurality of fourth intermediate figures respectively corresponding to original figures close to said objective figure, and obtaining a logical sum of said plurality of fourth intermediate figures to produce a modified base separation figure corresponding to said objective figure.

2. A method in accordance with claim 1, wherein said step (d) comprises the step of:

(f) when an outline of a base separation figure corresponding to said target contiguous figure is in contact with the outline of said objective figure, producing a linkage figure which links the base separation figures corresponding to said target contiguous figure and said objective figure, and obtaining a logical sum of said linkage figure and the base separation figure corresponding to said objective figure to produce a fifth intermediate figure with respect to said objective figure; and wherein said step (e) comprises the step of:

repeating said steps (c), (d), and (f) and obtaining a logical sum of said fourth intermediate figure and said fifth intermediate figure for the original figures close to said objective figure, to thereby produce said modified base separation figure corresponding to said objective figure.

3. A method in accordance with claim 2, wherein said step (f) comprises the steps of:

finding a boundary between said objective figure and the base separation figure corresponding to said target contiguous figure;

when a starting point of said boundary is a terminal point of a line segment constituting one side of said objective figure, producing a first line which internally divides an interior angle of said objective figure at said starting point, and when said starting point is not a terminal point of a line segment constituting one side of said objective figure, producing a second line by extending a specific side of the base separation figure corresponding to said target contiguous figure, said specific side starting from said starting point and being out of said boundary;

when an end point of said boundary is a terminal point of a line segment constituting one side of said objective figure, producing a third line which internally divides an interior angle of said objective figure at said end point, and when said end point is not a terminal point of a line segment constituting one side of said objective figure, producing a fourth line by extending a specific side of the base separation figure corresponding to said target contiguous figure, said specific side starting from said end point and being out of said boundary;

expanding the base separation figure corresponding to said target contiguous figure by a predetermined width to produce a expanded base separation figure; and producing a linkage figure defined by an outline of said expanded base separation figure, said boundary between said objective figure and the base separation figure corresponding to said target contiguous figure, and at least one of said first through fourth lines.

4. A method in accordance with claim 3, wherein said plurality of base separation figures represent areas to be painted with white ink.

5. A method of modifying a base separation figure to be painted with a specific base color ink, said method comprising the steps of:

(a) providing original figure data representing a plurality of original figures close adjacent to each other and base separation figure data representing a plurality of base separation figures corresponding to said plurality of original figures, each base separation figure representing an area laid under the corresponding original figure and being produced by at least one of contraction process and expansion process of a corresponding original figure;

(b) obtaining a logical sum of said plurality of original figures to produce a first intermediate figure;

(c) contracting said first intermediate figure by a predetermined width to produce a second intermediate figure; and (d) obtaining a logical sum of said second intermediate figure and said plurality of base separation figures to produce a modified base separation figure.

6. A method in accordance with claim 5, wherein said plurality of base separation figures represent areas to be painted with white ink.

7. An apparatus for modifying a base separation figure to be painted with a specific base color ink, comprising:

a memory for storing original figure data representing a plurality of original figures close to each other and base separation figure data representing a plurality of base separation figures corresponding to said plurality of original figures, each base separation figure representing an area laid under the corresponding original figure, at least one of said plurality of base separation figures being produced by contracting a corresponding original figure;

means for selecting an original figure to which a corresponding base separation figure was produced by contracting said original figure, and determining said selected original figure as an objective figure;

means for successively extracting one of said plurality of original figures which is close to said objective figure, and determining said extracted original figure as a target contiguous figure to be processed;

processing means for, when an outline of said target contiguous figure is in contact with an outline of said objective figure, producing a first intermediate figure by obtaining a logical sum of said objective figure and said target contiguous figure, producing a second intermediate figure by contracting said first intermediate figure by a predetermined width, producing a third intermediate figure by obtaining a logical product of said second intermediate figure and said objective figure, and producing a fourth intermediate figure by obtaining a logical sum of said third intermediate figure and a base separation figure corresponding to said objective figure; and summation means for obtaining a logical sum of a plurality of fourth intermediate figures corresponding to original figures close to said objective figure, to thereby produce a modified base separation figure corresponding to said objective figure.

8. An apparatus in accordance with claim 7, wherein said processing means comprises:

first means for, when an outline of a base separation figure corresponding to said target contiguous figure is in contact with the outline of said objective figure, producing a linkage figure which links the base separation figures corresponding to said target contiguous figure and said objective figure, and obtaining a logical sum of said linkage figure and the base separation figure corresponding to said objective figure to produce a fifth intermediate figure with respect to said objective figure; and wherein said summation means comprises:

means for obtaining a logical sum of said fourth intermediate figure and said fifth intermediate figure for the original figures close to said objective figure, to thereby produce said modified base separation figure corresponding to said objective figure.

9. An apparatus in accordance with claim 8, wherein said first means comprises:

second means for finding a boundary between said objective figure and the base separation figure corresponding to said target contiguous figure;

third means for, when a starting point of said boundary is a terminal point of a line segment constituting one side of said objective figure, producing a first line which internally divides an interior angle of said objective figure at said starting point, and when said starting point is not a terminal point of a line segment constituting one side of said objective figure, producing a second line by extending a specific side of the base separation figure corresponding to said target contiguous figure, said specific side starting from said starting point and being out of said boundary;

fourth means for, when an end point of said boundary is a terminal point of a line segment constituting one side of said objective figure, producing a third line which internally divides an interior angle of said objective figure at said end point, and when said end point is not a terminal point of a line segment constituting one side of said objective figure, producing a fourth line by extending a specific side of the base separation figure corresponding to said target contiguous figure, said specific side starting from said end point and being out of said boundary;

fifth means for expanding the base separation figure corresponding to said target contiguous figure by a predetermined width to produce a expanded base separation figure; and sixth means for producing a linkage figure defined by an outline of said expanded base separation figure, said boundary between said objective figure and the base separation figure corresponding to said target contiguous figure, and at least one of said first through fourth lines.

10. An apparatus in accordance with claim 9, wherein said plurality of base separation figures represent areas to be painted with white ink.

11. An apparatus for modifying a base separation figure to be painted with a specific base color ink, said apparatus comprising:

a memory for storing original figure data representing a plurality of original figures close to each other and base separation figure data representing a plurality of base separation figures corresponding to said plurality of original figures, each base separation figure representing an area laid under the corresponding original figure and being produced by at least one of contraction process and expansion process of a corresponding original figure;

means for obtaining a logical sum of said plurality of original figures to produce a first intermediate figure;

means for contracting said first intermediate figure by a predetermined width to produce a second intermediate figure; and means for obtaining a logical sum of said second intermediate figure and said plurality of base separation figures to produce a modified base separation figure.

12. An apparatus in accordance with claim 11, wherein said plurality of base separation figures represent areas to be painted with white ink.

* * * * *